United States Patent
Chhabra et al.

(10) Patent No.: US 10,754,960 B2
(45) Date of Patent: Aug. 25, 2020

(54) SUPPORT FOR INCREASED NUMBER OF CONCURRENT KEYS WITHIN MULTI-KEY CRYPTOGRAPHIC ENGINE

(71) Applicant: Intel Corporation, Santa Clara, CA (US)

(72) Inventors: Siddhartha Chhabra, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 333 days.

(21) Appl. No.: 15/815,917

(22) Filed: Nov. 17, 2017

(65) Prior Publication Data

US 2019/0156043 A1    May 23, 2019

(51) Int. Cl.
| | |
|---|---|
| *G06F 21/60* | (2013.01) |
| *H04L 9/08* | (2006.01) |
| *G06F 21/31* | (2013.01) |
| *G06F 21/78* | (2013.01) |
| *H04W 12/06* | (2009.01) |
| *H04L 9/06* | (2006.01) |
| *H04W 12/04* | (2009.01) |

(52) U.S. Cl.
CPC .......... *G06F 21/602* (2013.01); *G06F 21/31* (2013.01); *G06F 21/78* (2013.01); *H04L 9/08* (2013.01); *H04L 9/0877* (2013.01); *H04L 9/0897* (2013.01); *H04L 9/0631* (2013.01); *H04W 12/04* (2013.01); *H04W 12/06* (2013.01)

(58) Field of Classification Search
CPC ..... G06F 21/6218; G06F 21/606; H04L 9/08; H04L 9/083; H04L 9/0877; H04L 9/0897; H04L 9/0819; H04W 14/04; H04W 12/04033; H04W 12/0806
See application file for complete search history.

(56) References Cited

U.S. PATENT DOCUMENTS 9,596,243 B2 * 3/2017 Van Gestel ........... H04L 63/104
10,303,900 B2   5/2019 Chhabra et al.
(Continued)

OTHER PUBLICATIONS

Trusted Platform Module, Wikipedia, the free encyclopedia, https://en.wikipedia.org/wiki/Trusted_Platform_Module, 8 pages, retrieved on Sep. 18, 2017.

*Primary Examiner* — Paul E Callahan
(74) *Attorney, Agent, or Firm* — Nicholson De Vos Webster & Elliott

(57) ABSTRACT

A server includes a processor core including system memory, and a cryptographic engine storing a key data structure. The data structure is to store multiple keys for multiple secure domains. The core receives a request to program a first secure domain into the cryptographic engine. The request includes first domain information within a first wrapped binary large object (blob). In response a determination that there is no available entry in the data structure, the core selects a second secure domain within the data structure to de-schedule and issues a read key command to read second domain information from a target entry of the data structure. The core encrypts the second domain information to generate a second wrapped blob and stores the second wrapped blob in a determined region of the system memory, which frees up the target entry for use to program the first secure domain.

20 Claims, 16 Drawing Sheets

(56) References Cited

U.S. PATENT DOCUMENTS

| | | | | |
|---|---|---|---|---|
| 2014/0359047 A1* | 12/2014 | Lee | ................... | H04L 67/2852 |
| | | | | 709/213 |
| 2019/0220625 A1* | 7/2019 | Durham | ................... | G06F 8/63 |

* cited by examiner

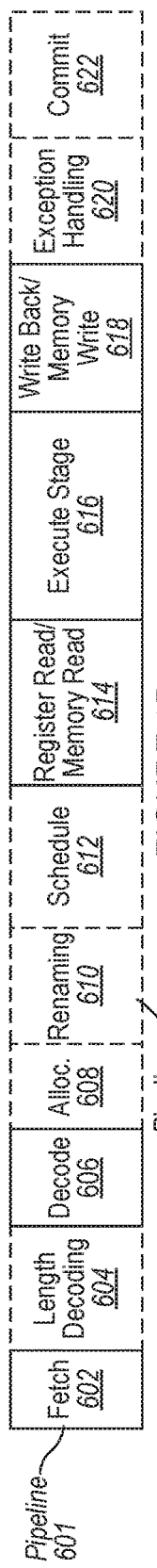
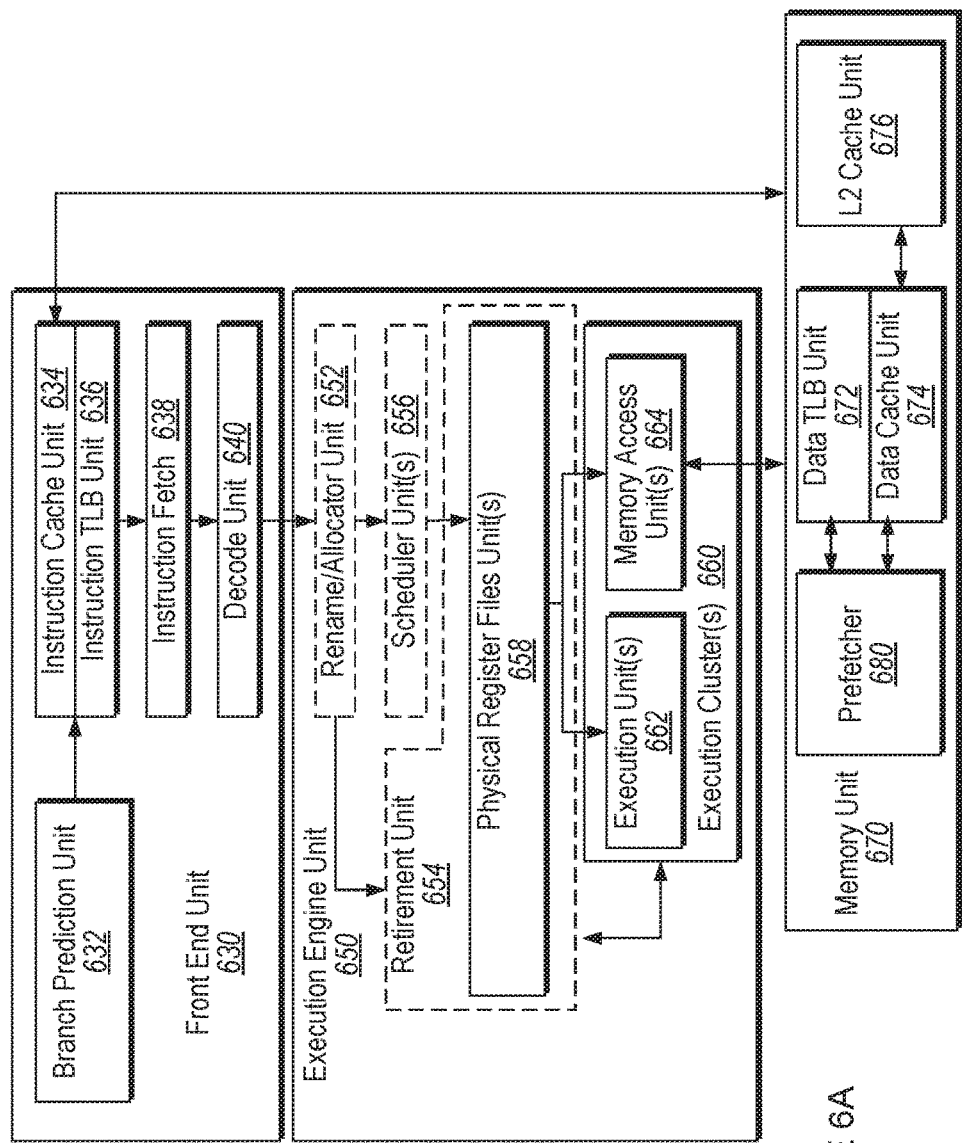
FIGURE 6B
FIGURE 6A

US 10,754,960 B2

SUPPORT FOR INCREASED NUMBER OF CONCURRENT KEYS WITHIN MULTI-KEY CRYPTOGRAPHIC ENGINE

TECHNICAL FIELD

The disclosure relates to protection of data stored in memory of a computer system, and more particularly, to support for an increased number of concurrent keys within multi-key cryptographic engines.

BACKGROUND

Modern computing systems employ disk encryption to protect data stored at rest on hard drive disks or other data storage. Attackers, however, can use a variety of techniques including bus scanning, memory scanning, and the like, to retrieve data from memory. The memory may itself include the keys used for disk encryption, thus exposing the data encrypted on a disk drive. Various techniques, therefore, have been employed to protect sensitive data residing in at least some regions of memory. Doing so has become challenging, particularly in a cloud or server environment where multiple customer workloads (from different entities) may be supported simultaneously on the same server.

BRIEF DESCRIPTION OF THE DRAWINGS

FIG. 6A is a block diagram illustrating an in-order pipeline and a register renaming stage, out-of-order issue/execution pipeline according to one implementation.

FIG. 6B is a block diagram illustrating a micro-architecture for a processor or an integrated circuit that may implement hardware support for a multi-key cryptographic engine, according to an implementation of the disclosure.

DETAILED DESCRIPTION

Figure 1:
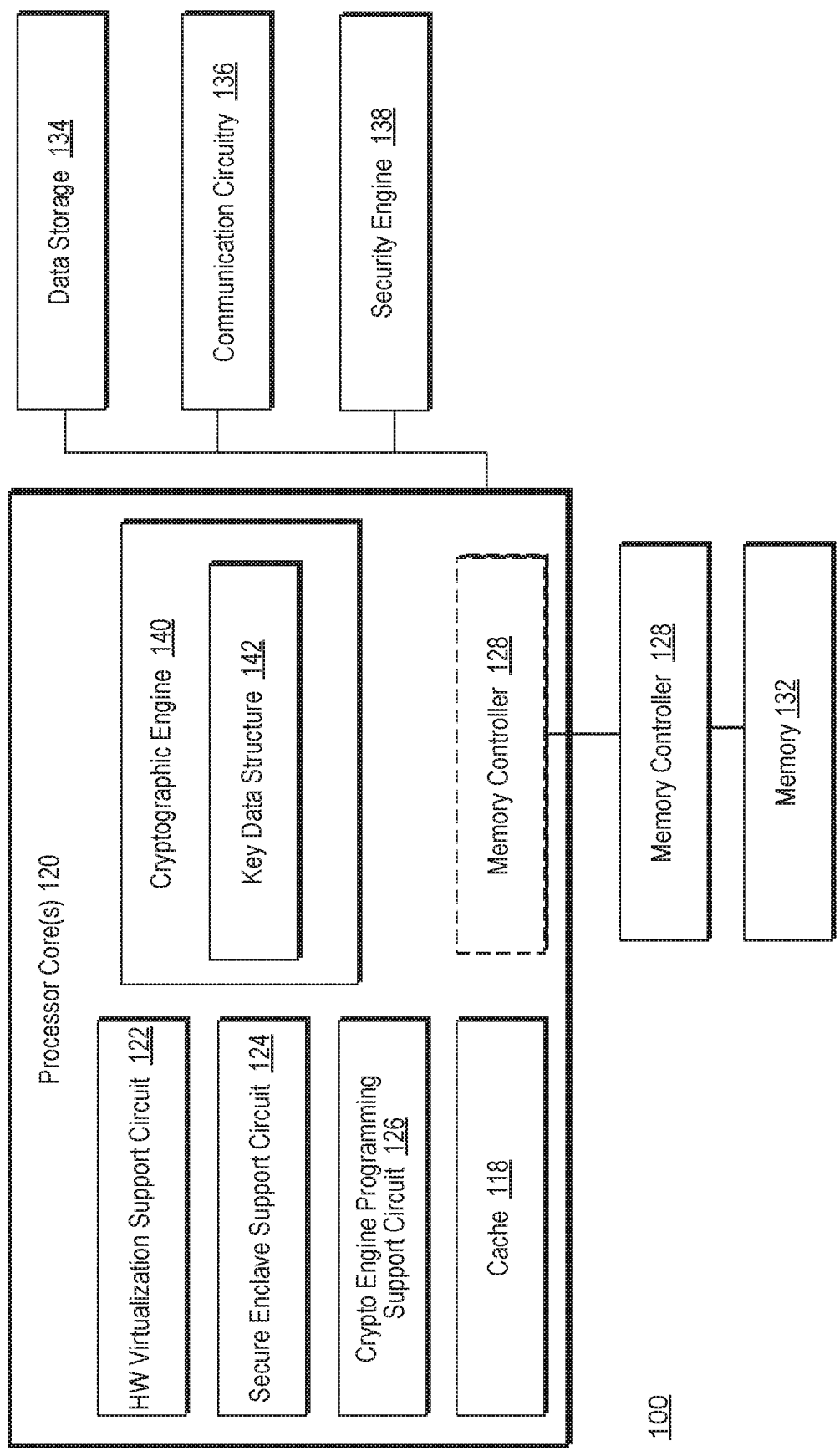
FIG. 1 is a block diagram of a computing device for secure programming of a hardware cryptographic engine, according to various implementations.

Various techniques have been employed to protect sensitive data residing in regions of memory. Some processors provide cryptographic mechanisms for encryption, integrity, and replay protection. Memory encryption protects the confidentiality of memory-resident data. For example, total memory encryption (TME) may encrypt data that is moving from a processor core to memory, and may decrypt the encrypted data on its way back to the processor core.

In some implementations, such as in Intel® Software Guard Extensions (SGX) technology, for example, a processor employs a memory encryption engine (MEE) to protect data when it is resident in memory, e.g., within protected enclaves or portions of memory. The MEE extends encryption protection (such as provided by the TME) to provide additional security properties such as integrity and replay protection. Integrity protection prevents an attacker from causing hidden modifications to the cipher text (e.g., encrypted data, as opposed to plaintext which is unencrypted data) in memory. Furthermore, replay protection eliminates undetected temporal substitution of the cipher text. In the absence of such protections the MEE provides, an attacker with physical access to the system can record snapshots of data lines and replay them at a later point in time to gain access to the memory-resident data.

Implementations of the disclosure extend the functionality of a TME or MEE engine to support multiple keys in a multi-key, hardware cryptographic engine. This extension of functionality provides support for a different key per secure domain serviced by a server, e.g., up to dozens of domains on a given server. Domains may refer to workloads, such as a client machine (e.g., virtual machine), an operating system, an application, or other types of workloads the server supports that may be associated with different customer entities. For example, a secure domain may be a customer workload, such as an operating system, along with other ring-3 applications executing on top of the operating system, or a virtual machine (VM) executing on top of a virtual machine monitor (VMM) along with other ring-3 applications. The benefit of supporting the use of multiple keys is to provide cryptographic isolation between different customer domains, e.g., one secure domain cannot access encrypted data if that encrypted data belongs to a different secure domain being protected with a different cryptographic key. These benefits extend to the ability of a cloud server provider (CSP) to support a growing number of customer workloads on the same server, to adapt to growing demands for cloud-based hardware resources.

In various implementations, the cryptographic engine may provide support for multiple keys through use of a key data structure (such as a key table) resident in hardware and an associated region of memory for overflow. The key data structure may store a key and other domain information associated with each domain programmed into the cryptographic engine to be protected. As long as an entry in the key data structure is available, a new domain can be programmed into the cryptographic engine and protected with a unique key that is stored with other domain information (such as a domain identifier) in the available key data structure entry. As new domains are added and the key data structure becomes full, inactive or least recently used domains may be de-scheduled by wrapping the key and domain information for a de-scheduled domain into a wrapped binary large object (blob). The process of wrapping includes encryption, using a platform key, of a group of data into a single encrypted package (e.g., the blob) that may then be individually managed. This wrapped blob may then be stored in a determined region of the memory set aside for secure storage of excess domains. In this way, a key data structure entry is freed up for a new domain and the key and the domain information for a de-scheduled domain is preserved in memory. Subsequently, when a memory access request to the de-scheduled domain is detected, the previously-stored wrapped blob may be read out of memory and presented as a new secure domain request to hardware or software that is managing the scheduling of domains.

In various implementations, the domain management discussed above may be performed independently in cryptographic hardware, or may be performed by domain management software that the processor core executes. In one implementation, the process of domain management, which involves the multiple cryptographic keys, may be performed by hardware of the cryptographic engine, which is discussed in more detail with reference to FIG. 5. The domain management process may also be managed by untrusted software, instructions for which are executed by the processor core. The management code may use the default platform encryption key. This platform key may not be evicted and may always be used to protect the VMM and other management software. When the domain management process is managed by untrusted software, additional safeguards may be employed to ensure the management is performed on wrapped blobs associated with each domain, and thus the untrusted software does not access the domain information or keys in plain text. This software managed mode of domain management is discussed in more detail with reference to FIGS. 6-7.

These features and others herein described include many benefits, in particular, the ability to cryptographically isolate a large number of domains from each other with potentially unlimited numbers of cryptographic keys. Each domain may belong to a different customer, and thus there is a need to isolate access to data in memory of one domain from that of another domain in memory. For example, each domain is cryptographically isolated from another domain being supported by a server when each domain uses a different key for securing data in memory. Accordingly, as datacenters expand and endeavor to support multiple customers on the same server in some cases, the data stored in memory and associated with different domains are encrypted with a different key, and thus there can be no access of data in the memory by a different domain than the domain for which the data was encrypted. The ability to support multiple keys allows a server, and a datacenter generally, to expand with increased demand for processing resources that the server provides.

FIG. 1 is a block diagram of at least one embodiment of a computing device 100 for secure programming of a hardware cryptographic engine, according to various implementations. In one implementation, computing device 100 may include, among other components, one or more processor cores 120, a memory controller 128, system memory 132, data storage 134, communication circuitry 136, a security engine 138, and a hardware cryptographic engine 140.

In one implementation, the computing device is a server 100 that services the domains, e.g., different workloads such as a client machine, an operating system, an application, or other types of workloads being supported. In some implementations, one or more of the processor cores 120 may include cache 118 (e.g., a multi-level cache), a hardware virtualization support circuit 122, a secure enclave support circuit 124, a crypto engine programming support circuit 126, a cryptographic engine 140 (such as the MKTME previously mentioned), and optionally a processor-side memory controller 128.

In one implementation, the cryptographic engine 140 includes a key data structure 142 retained in local hardware, e.g., a local hardware cache, registers, or the like. The key data structure 142 may be a table or other data structure capable of being indexed within hardware cache. In various implementations, trusted software may program the cryptographic engine 140 using one or more specialized instructions of the processor core to generate wrapped programming information, e.g., a group of data that is encrypted together with a platform key into a single package. The trusted software provides the wrapped programming information to untrusted software such as a kernel-mode driver. The untrusted software invokes an unwrapping engine using one or more specialized instructions of the processor core to unwrap the programming information and program the cryptographic engine 140. By using specialized processor core instructions to wrap (e.g., encrypt) the programming information, the computing device 100 may ensure that trusted software programs the cryptographic engine 140. By allowing untrusted software to invoke the unwrapping engine, the computing device 100 allows system software (e.g., an operating system and/or VMM) to manage programming of the cryptographic engine 140. Additionally, by performing wrapping and/or unwrapping with the processor core, the computing device 100 may reduce complexity of the cryptographic engine 140. The functionality of wrapping and unwrapping is discussed in more detail with reference to FIG. 3.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. The computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor core in some embodiments. Furthermore, a memory controller for the memory 132 may be included within the processor core.

The processor core 120 may be embodied within a single or multi-core processor(s), digital signal processor, microcontroller, or other processor or processing/controlling circuit. The hardware virtualization support circuit 122 may support virtualized execution of operating systems, applications, and other software by the computing device 100. The hardware virtualization support circuit 122 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor core. One or more guest OSs may execute in the VMX non-root mode. Those guest OSs may execute in ring zero, similar to being executed without virtualization. The hardware virtualization support circuit 122 may also support extended page tables (EPT), which may be embodied as hardware-assisted second-level page address translation. The hardware virtualization support circuit 122 may be embodied as, for example, Intel® VT-x technology.

The secure enclave support circuit 124 allows the processor core to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor core while being executed or while being stored in certain protected cache memory of the processor core. The code and data included in the secure enclave may be encrypted when stored in a shared cache or the main memory 132. The secure enclave support circuit 124 may be embodied as a set of processor instruction extensions that allows the processor core to establish one or more secure enclaves in the memory 132. For example, the secure enclave support circuit 124 may be embodied as Intel® Software Guard Extensions (SGX) technology.

The crypto engine programming support circuit 126 allows the processor core 120 to program the cryptographic engine 140 to provide cryptographic protection of domain data. In particular, the processor core may enable or disable encryption for a domain and may securely provide encryption keys to the cryptographic engine 140. The crypto engine programming support circuit 126 may be embodied as one or more specialized processor instructions (e.g., the instructions BIND, UNWRAP, or other instructions to be discussed in more detail) and associated hardware, microcode, firmware, or other components of the processor core 120.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory controller 128 is coupled to the memory 132 to store to and fetch from the memory, which in some cases may depend on misses to the cache 118. The memory controller 128 may be communicatively coupled to, or integrated within, the processor core 120.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include the security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor core. Thus, the security engine 138 may be used to establish a trusted execution environment separate from code executed by the processor core 120. The security engine 138 may communicate with the processor core 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security and manageability engine (CSME) incorporated in a system-on-a-chip (SoC) of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor core), also known as "out-of-band" communication.

In various implementations, the cryptographic engine 140 may be embodied as a microcontroller, microprocessor, functional block, logic, or other circuit or collection of circuits capable of performing the functions described herein. As further described below, the cryptographic engine 140 may encrypt and/or decrypt domain data read or written to memory. The cryptographic engine 140 may cache the internal key data structure 142, which the cryptographic engine 140 may use to identify domain accesses to be protected. As discussed, the key data structure 142 may be a table or other data structure cable of being indexed and stored within hardware of the cryptographic engine 140. In one implementation, the hardware is a cache, a set of registers, or other flash memory.

Accordingly, the key data structure 142 may be controlled and/or programmed by hardware of the cryptographic engine 140 or by trusted software, for example using the crypto engine programming support circuit 126 of the processor core 120. The key data structure 142 may be adapted to store keys and domain information for the domains. The encryption keys and/or other secret information of the key data structure 142 may not be available to untrusted software. In some embodiments, the cryptographic engine 140 may be incorporated along with the memory controller 128 and the processor core 120 in a system-on-a-chip (SoC) of the computing device 100.

Figure 2:
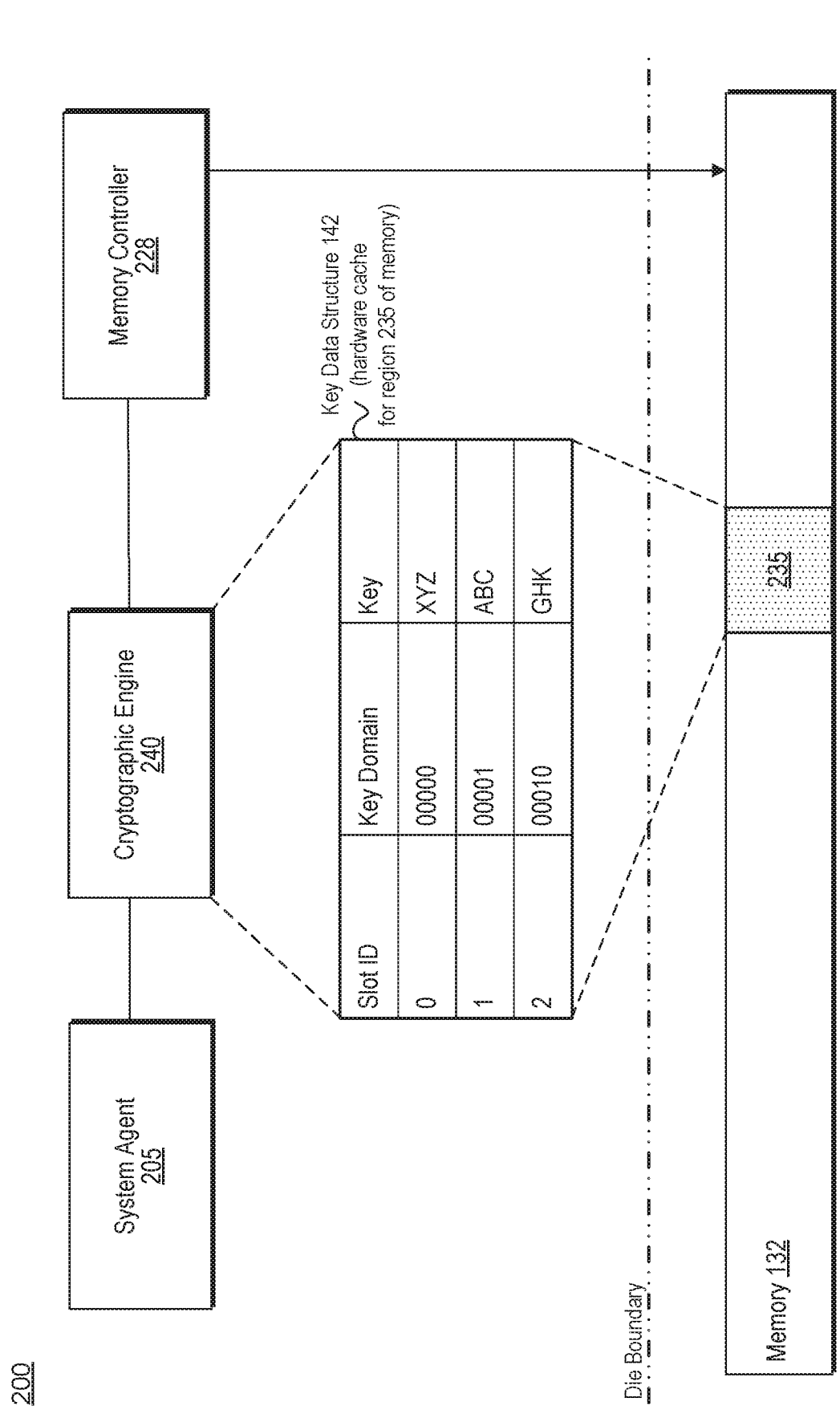
FIG. 2 is a system block diagram illustrating a key data structure of the cryptographic engine that is capable of caching a large number of keys stored in memory, according to various implementations.

FIG. 2 is a system block diagram 200 illustrating a key data structure 142 of the cryptographic engine 140 (FIG. 1) that is capable of caching a large number of keys stored in memory, according to various implementations. The system block diagram 200 includes a system agent 205, a cryptographic engine 240, and a memory controller 228 coupled together as illustrated. In various implementations, the system agent 205 represents a piece of hardware that receives memory requests from all agents on the system (e.g., cores, graphics, IO devices). The domains may include virtual machines or operating systems, for example, running on the processor core(s) 120. Each domain executing on the cores may issue memory requests as needed and will go through the system agent 205. The system agent 205 may in turn send the requests to the memory controller 228, which in turn retrieves the requested data (or writes the requested data) to the memory 132.

In various implementations, the cryptographic engine 240 may be implemented as part of the memory controller 228, so as to perform cryptographic and security-related functions in relation to data read from and written to the memory 132 on behalf of the domains. As previously discussed, the key data structure 142 may be stored in hardware of the cryptographic engine 240 for greater security, such as in a cache, registers, or the like. The system memory 132 may include a determined region 235 in which to store wrapped blobs. In one implementation, the determined region 235 of memory is indexed according to domain identifier (ID) of each respective secure domain. Accordingly, the key data structure 142 is effectively cached for the wrapped blobs that are stored in the determined region 235 of the memory 132.

In various implementations, the key data structure 142 includes indexed rows, each with a slot identifier (ID), a key domain (e.g., a domain ID), and a secure key for performing encryption and decryption on domain data. The key domain may be used to identify a domain (e.g., higher order address bits in one implementation), and in one implementation, does not have to be stored in the key data structure if the index (slot ID) corresponds to the key domain in a one-to-one correspondence. The key data structure 142 may be of a fixed size to allow for a practical implementation of the cryptographic engine 240 that includes physical limits.

In various implementations, the cryptographic engine 240 may program the key data structure 142 using wrapped blobs. The wrapped blobs are wrapped using a platform key that is pre-programmed into the cryptographic engine for use in domain management of cryptographic keys. In one embodiment, the platform key is programmed for one reset cycle and may not persist across resets. The wrapped blobs may be stored in the determined region 235 of the memory 132 and be restored to the key data structure 142 along with a domain switch (to start execution of a domain). The key data structure 142 may thus operate as cache for secure domain information (cryptographic key and other domain information) with the system memory, forming a virtually unlimited store for encrypted domain information to the extent the determined region 235 is sufficiently large. In one implementation, the determined region 235 of the memory may be identified as a secure enclave and protected as secure memory, but still be protected with a double level of security inasmuch as the domain information is encrypted as wrapped blobs.

The determined region 235 in the memory 132 may be memory taken from system memory of the computing device 100, and may be set up by system firmware, e.g., the basic input-output (I/O) system (BIOS) of the computing device. For example, upon boot of the computing system 100, the BIOS may store, within a range register, reservation information to reserve the determined region 235 of the system memory for hardware. After boot has completed, the reservation information may be retrieved from the range register and be utilized to program the hardware cryptographic engine and reserve the determined region 235 of memory.

In various implementations, the determined region 235 may be of a size based on the number of secure domains that can be supported. As just one example, if the size of each set of domain information (to be programmed into the cryptographic engine 140) is N bytes and 16K secure domains are to be supported, then the BIOS may reserve 16N KB of memory for the determined region 235 of memory. The domain ID may be used to find the address within the determined region 235 of the memory 132 to locate a given wrapped blob. In one implementation, there may be a one-to-one mapping between a domain ID and the location in the predetermined region 235 of the memory for storing the wrapped blobs, e.g., in the case domain information is to be evicted from the key data structure 142. Note that when, in response to a memory access of a domain, the key is not found in the key data structure 142 and should be fetched from memory, there may be a delay introduced for the incoming request as a result of the fetch and subsequent unwrapping of domain information to be stored in the key data structure 142. Since it is expected that once domain information is restored to the cryptographic engine 140, the domain information is used for some time, these overheads of delay can be amortized over time, and thus minimized.

The computing system 100 may employ at least two modes for supporting an enhanced number of keys that may effectively be unlimited in being able to secure any number of domains for which domain programming is requested. The first mode may employ management software through the use of instruction set architecture (ISA) to achieve the wrapping and save/restore of secure domain information to and from the memory 132. The second mode may be a hardware mode where the cryptographic engine 140 may advertise a large number of keys (more than what can be provisioned for in the cryptographic hardware 140) and then manages the keys associated with domains independently without software intervention.

Figure 3:
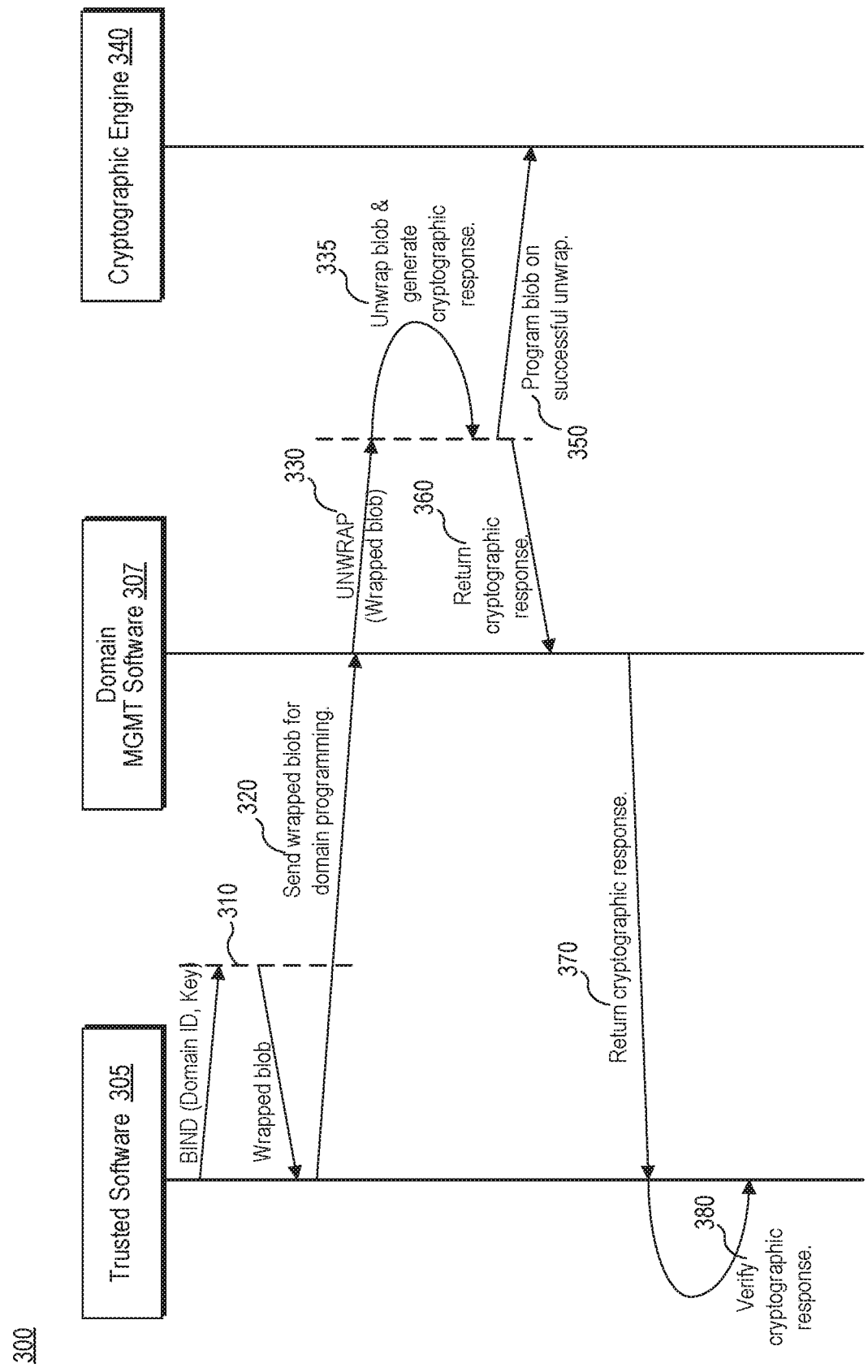
FIG. 3 is a system flow diagram illustrating a method for software management of programming multiple secure domains, using corresponding multiple keys, into a hardware cryptographic engine, according to various implementations.

FIG. 3 is a system flow diagram illustrating a method 300 for software management of programming multiple secure domains, using corresponding multiple keys, into a hardware cryptographic engine 340, according to various implementations. The hardware cryptographic engine 340 may be the same or similar as the hardware cryptographic engine 140 or 240. The method 300 may be executed between trusted software 305, domain management software 307 (e.g., untrusted software executable by the processor core 120), and the cryptographic engine 340. As discussed previously, the crypto engine programming support circuit 126 may be embodied as one or more specialized processor instructions (e.g., the instructions BIND, UNWRAP, or other instructions to be discussed in more detail) and associated hardware, microcode, firmware, or other components of the processor core 120.

In various implementations, for example, the method 300 may begin with the trusted software 305, in order to set up a domain, invoking special instruction BIND to encrypt the key associated with the domain and other domain programming information (e.g., domain ID) into a wrapped binary large object ("blob") (310). This programming information may be considered secret keying material to be encrypted as the wrapped blob (310) so that, when handled by the untrusted domain management software 307, the untrusted domian management software 307 is unable to access or see the secret keying material. The method 300 may continue with sending the wrapped blob (310) to the domain management software 307 for programming into the cryptographic engine 340 (320). The BIND instruction therefore wraps information in the form of secret data for a specific target on the computing device platform, e.g., the cryptographic engine 340 in this case.

Once the domain management software 307 has the wrapped blob (310), the method 300 may continue with this untrusted domain management software 307 invoking an UNWRAP instruction (330), which verifies the integrity of the blob using the platform key, and if verified successfully, generating a cryptographic response that can be detected by the untrusted domain management software 307 and is verifiable by the trusted software 305 (335). The method 300 may continue with the domain management software 307 programming the blob into the cryptographic engine 340 upon successful unwrap (350). This programming of the cryptographic engine 340 may be performed over a trusted hardware network within the processor core 120, and therefore outside entities cannot snoop this transaction. Accordingly, there is no way for an attacker to access the programming of the blob at this point in the data flow.

The method 300 may continue with the domain management software 307 receiving the cryptographic response, which may be passed on to the trusted software 305 (360). Accordingly, the method 300 may continue with the domain management software 307 returning the cryptographic response to the trusted software 305 (370), which signals to the trusted software 305 that the untrusted domain management software 307 indeed invoked the UNWRAP instruction to program the cryptographic engine 340 with the new domain. In this way, the trusted software 305 verifies the programming was successful (380) and can thus track number of secure domains currently being supported by the cryptographic engine 340.

The UNWRAP instruction may therefore take the wrapped blob as a memory operand and program target-specific information (e.g., key and domain information) to the target device (e.g., the cryptographic engine 240), in response to successful unwrapping of the wrapped blob. The UNWRAP instruction may expect a target and a target-specific command on which to operate. For the cryptographic engine 240 as the target, Table 1 includes a list of commands that may be among those target-specific commands. Note that "KD" stands for "key domain."

TABLE 1

| Command | Encoding | Description |
| --- | --- | --- |
| KD_SET_KEY | 0 | Associate domain key with specific domain using the wrapped blob provided. |
| KD_CLEAR_KEY | 1 | Clear key associated with the domain. |
| KD_READ_KEY | 2 | Read key from the key data structure 142. This command does not read the key in plain text form, but generates |

TABLE 1-continued

| Command | Encoding | Description |
| --- | --- | --- |
| | | a wrapped blob with the key for the domainmanagement software 307 to manage secure domains. |

Note that for the above commands to work, the UNWRAP instruction may also expect a domain ID to be included as part of the domain information to identify the domain on which to operate. As an example, for software to associate a key with a domain, the trusted software 305 may generate a BIND instruction to wrap a blob with the domain ID and in response to a clear the key command. In some implementations, in order to ensure security, these commands may entail the caller including some ownership information. As an example, the current key associated with the domain may have to be provided in the KD_CLEAR_KEY command. As only the owner that set the key knowns the key, the authenticity of the KD_CLEAR_KEY command may be established. In some implementations, the KD_READ_KEY is a command that allows the domain management software 307 to use the key data structure 142 as cache with the proposed wrapped keys mechanism, to be explained in more detail with reference to FIG. 5. In particular, the KD_READ_KEY command allows untrusted software to read domain information out of the key data structure 142 in the form of a wrapped blob, so as to manage the domains without direct access to secure key and domain information.

Figure 4:
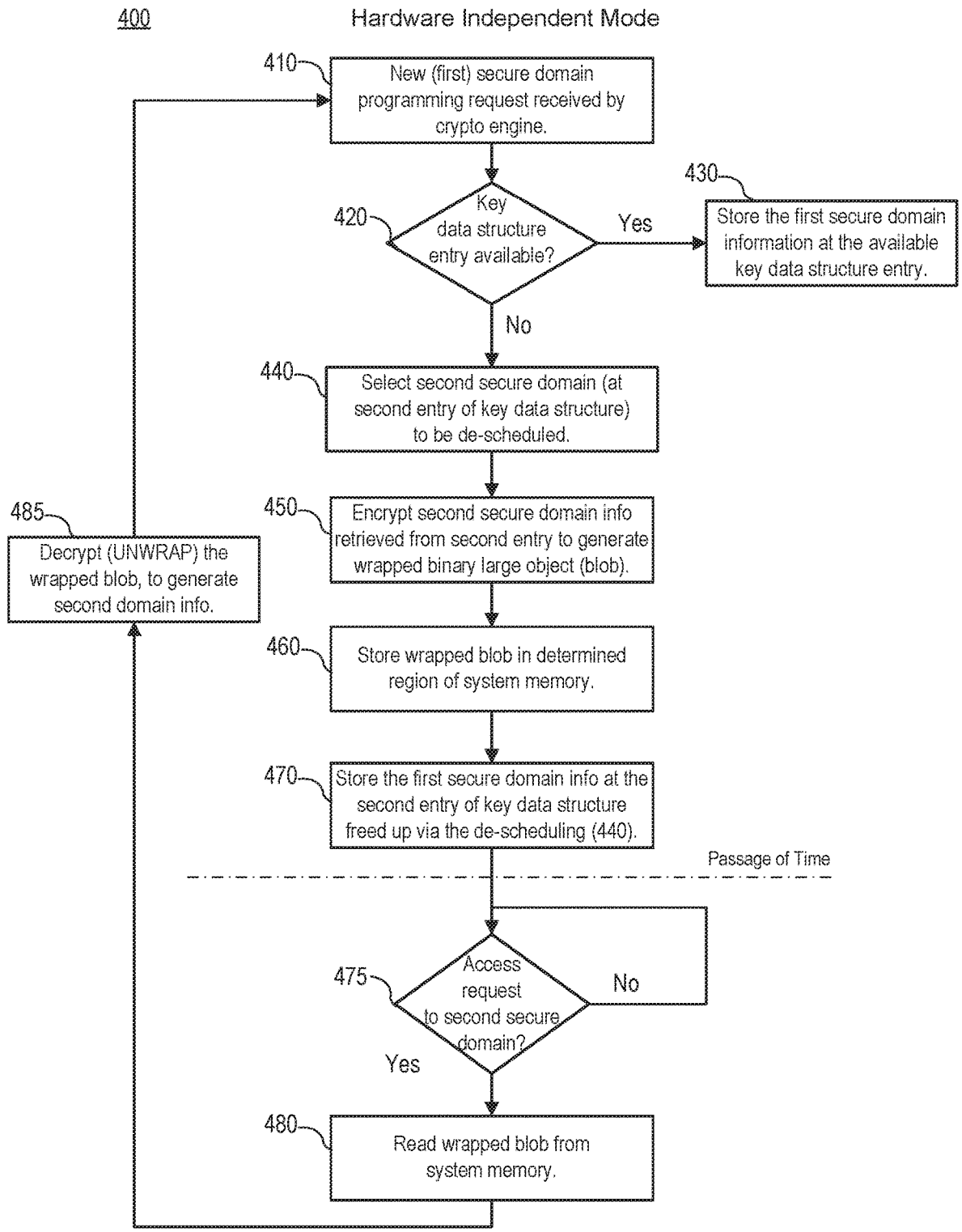
FIG. 4 is a flow chart of a method of employing a hardware mode of managing the large number of keys stored in memory that a cryptographic engine can access to secure a number of domains of a server, according to one implementation.

FIG. 4 is a flow chart of a method 400 of employing a hardware mode of managing the large number of keys stored in memory that the cryptographic engine 140 may access to secure a number of domains of a server, according to one implementation. Accordingly, the method 400 may be performed by processing logic that may comprise hardware (e.g., circuitry, dedicated logic, programmable logic, microcode, etc.), firmware, or a combination thereof. In one implementation, method 400 is performed by processor core 120 of FIG. 1, e.g., by the cryptographic engine 140. In another implementation, the method 400 is performed by any of the processors described with respect to FIGS. 6A-14.

With reference to FIG. 4, the method 400 may start with processing logic receiving a new secure domain programming request (410). The programming request may be received by the crypto engine programming support circuit 126 to program the new secure domain into the cryptographic engine 140. The method 400 may continue with the processing logic determining whether there is an entry available in the key data structure 142, e.g., not filled (420). If yes, the method 400 may continue with the processing logic storing first secure domain information at the available entry in the key data structure (430). The first domain information may include a first key and a first domain identifier, for example.

If no at block 420, the method 400 may continue with the processing logic selecting a second secure domain to be de-scheduled, wherein the second secure domain is indexed within the key data structure 142 at a second entry (440). The method 400 may continue with the processing logic encrypting, using a platform key, second domain information retrieved from the second entry for the second secure domain, to generate a wrapped binary large object (blob) (450). The second domain information may include a second key and second domain identifier. The method 400 may continue with the processing logic storing the wrapped blob in a determined region of the system memory that is indexed according to the second domain identifier (460). The method 400 may continue with the processing logic storing the first domain information in the second entry of the key data structure, which has been freed up by virtue of the de-scheduling in block 440 (470).

After some time passes, the method 400 may continue with the processing logic receiving an access request to the second secure domain (475). Recall that the second secure domain was de-scheduled from being supported by the cryptographic engine 140, and therefore, now needs to be scheduled anew to provide renewed cryptographic support to the second domain. Accordingly, the method 400 may continue with the processing logic reading the wrapped blob from the determined region 235 of the memory 132 (480). The method 400 may continue with the processing logic decrypting the wrapped blob (like performing an UNWRAP operation), to generate the second domain information (485). This second domain information, now in the clear at the cryptographic engine, may be used within a request to again schedule the second domain. The domain scheduling by the cryptographic engine may therefore be repeated, as per method 400, whether it is a request for a new domain or a renewed requested for a domain previously archived in memory.

Figure 5:
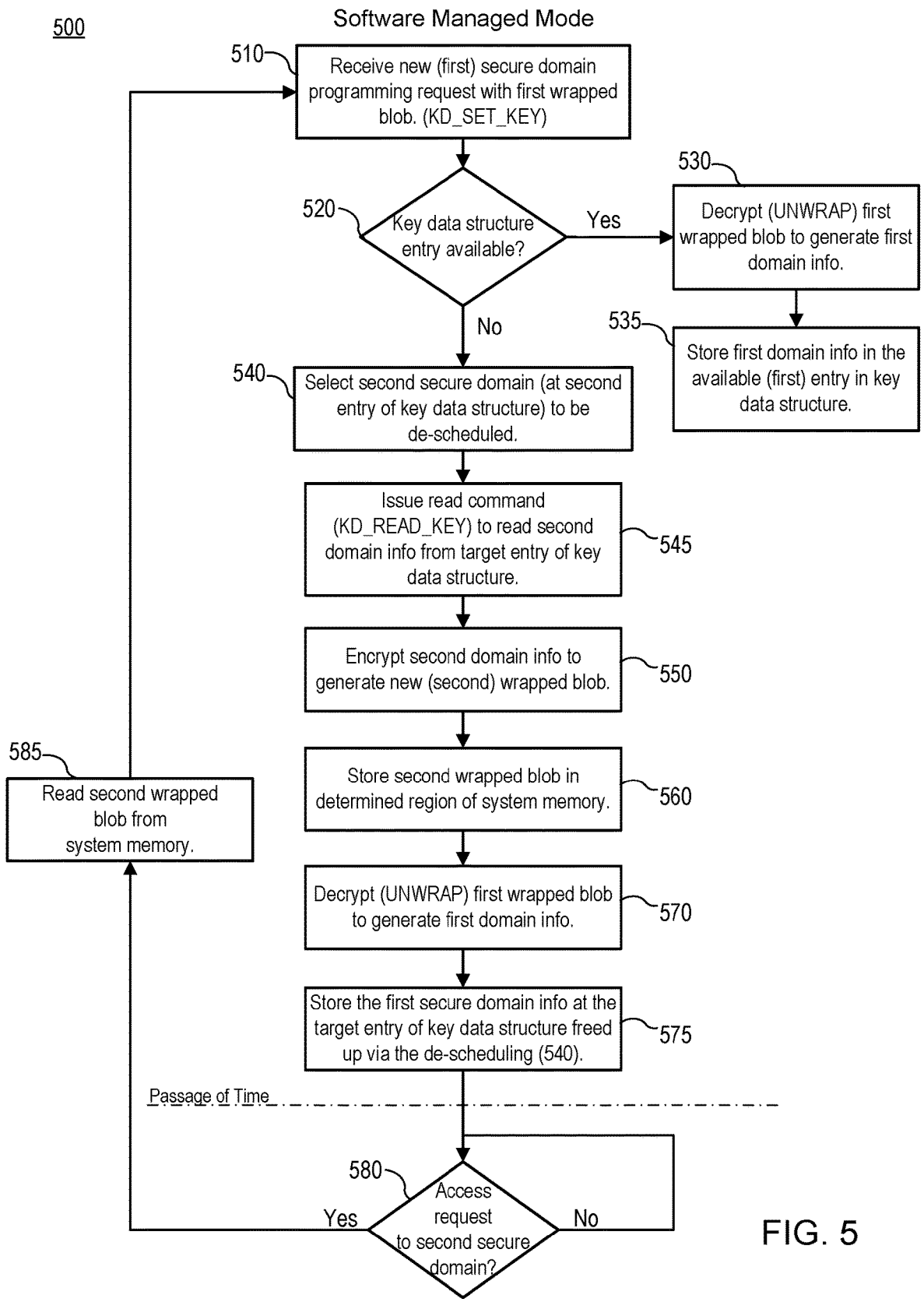
FIG. 5 is a flow chart of a method for software management of programming multiple secure domains, using corresponding multiple keys, into a hardware cryptographic engine, according to various implementations.

FIG. 5 is a flow chart of a method 500 for software management of programming multiple secure domains, using corresponding multiple keys, into the hardware cryptographic engine 140 or 440, according to various implementations. The method 500 may be performed by processing logic that may comprise hardware (e.g., circuitry, dedicated logic, programmable logic, microcode, etc.), software (such as operations being performed by the trusted software 305 and by the untrusted domain management software 307), firmware or a combination thereof. In one implementation, the method 500 is performed by the processor core 120 of FIG. 1. In another implementation, the method 500 is performed by any of the processors described with respect to FIGS. 6a-15.

With reference to FIG. 5, the method 500 may begin with the processing logic receiving a new (e.g., first) secure domain programming request that includes a first wrapped blob containing encrypted first domain information (510). This request may come from the trusted software 305 with execution of a KD_SET_KEY command to associate a domain key with a first secure domain. The method 500 may continue with the processing logic determining whether an entry is available in the key data structure 142 (520). If yes, the method 500 may continue with the processing logic decrypting (e.g., with use of an UNWRAP command) the first wrapped blob to generate first domain information in clear text (530), and storing the first domain information in the available (e.g., first) entry in the key data structure 142 (535).

With continued reference to FIG. 5, if there is no entry available in the key data structure 142 (520), the method 500 may continue with the processing logic selecting a second secure domain at a second entry of the key data structure to be de-scheduled (540). In various implementations, the processing logic may determine which programmed domain is inactive or been least recently used (LRU), or perform some other similar algorithm to select a domain to be de-scheduled, e.g., as "the second secure domain" in method 500. The method 500 may continue with the processing logic issuing a key read command (e.g., KD_READ_KEY from Table 1) to read second domain information from a target entry of the key data structure 142 (545). In response to the key read command, the method 500 may continue with the processing logic encrypting the second domain information to generate a new (e.g., second) wrapped blob (550) and storing the second wrapped blob in the determined region of system memory 132 (560). The method 500 may continue with the processing logic programming the first secure domain into the cryptographic engine by decrypting (e.g., via an UNWRAP command) the first wrapped blob to generate first domain information (570) and storing the first domain information at the target entry of the key data structure freed up via the de-scheduling of the second domain (575).

After some time passes, the method 500 may continue with the processing logic receiving an access request to the second secure domain (580). Recall that the second secure domain was de-scheduled from being supported by the cryptographic engine 140, and therefore, now needs to be scheduled anew to provide renewed cryptographic support to the second domain. Accordingly, the method 500 may continue with the processing logic reading the second wrapped blob from the determined region 235 of the memory 132 (585). The method may newly respond to the second wrapped blob as a request to program the second secure domain into the hardware cryptographic engine (510). In this way, the software mode of domain management may repeat itself in handling the second wrapped blob as a new, e.g., third request for a third secure domain. Although the second wrapped blob was read out of memory, it may be treated as if it were a new request from the trusted software 305.

Domain information was previously referred to generically, e.g., that a single base key would be stored wrapped in memory. However, in order to reduce performance overheads, an expanded key schedule may also be stored in memory instead of just the base key. This is made possible since the memory requirements for expanded key schedule are relatively small (e.g., 176B for AES-128). This optimization will allow 10 cycles for expansion to be saved on restoring a domain from memory. When the hardware AES encryption needs these keys, hardware of the cryptographic engine 140 (or other security hardware) may request this blob or unwrap the blob out of memory for use in the ten rounds (or however many rounds) of AES encryption (or other type of encryption) to be performed. This optimization allows access to all ten keys, and saves 9 cycles that would otherwise be needed for expansion of each individual key, to be saved on restoring a domain from the determined region 235 of the memory 132.

FIG. 6A is a block diagram illustrating a micro-architecture for a processor 600 that implements hardware support for a multi-key cryptographic engine, according to an implementation. Specifically, processor 600 depicts an in-order architecture core and a register renaming logic, out-of-order issue/execution logic to be included in a processor according to at least one implementation of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one implementation, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different scheduler circuits, including reservations stations (RS), central instruction window, etc. The scheduler unit(s) 656 is coupled to the physical register set(s) unit(s) 658. Each of the physical register set(s) units 658 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 658 is overlapped by the retirement unit 654 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register set(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some implementations may include a number of execution units dedicated to specific functions or sets of functions, other implementations may include only one execution unit or multiple execution units that all perform all functions. The scheduler unit(s) 656, physical register set(s) unit(s) 658, and execution cluster(s) 660 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain implementations are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some implementations DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary implementation, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one implementation, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated implementation of the processor also includes a separate instruction and data cache units and a shared L2 cache unit, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some implementations of the disclosure. The solid lined boxes in FIG. 6B illustrate an in-order pipeline 601, while the dashed lined boxes illustrate a register renaming, out-of-order issue/execution pipeline 603. In FIG. 6B, the pipelines 601 and 603 include a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 620, and a commit stage 622. In some implementations, the ordering of stages 602-622 may be different than illustrated and are not limited to the specific ordering shown in FIG. 6B.

Figure 7:
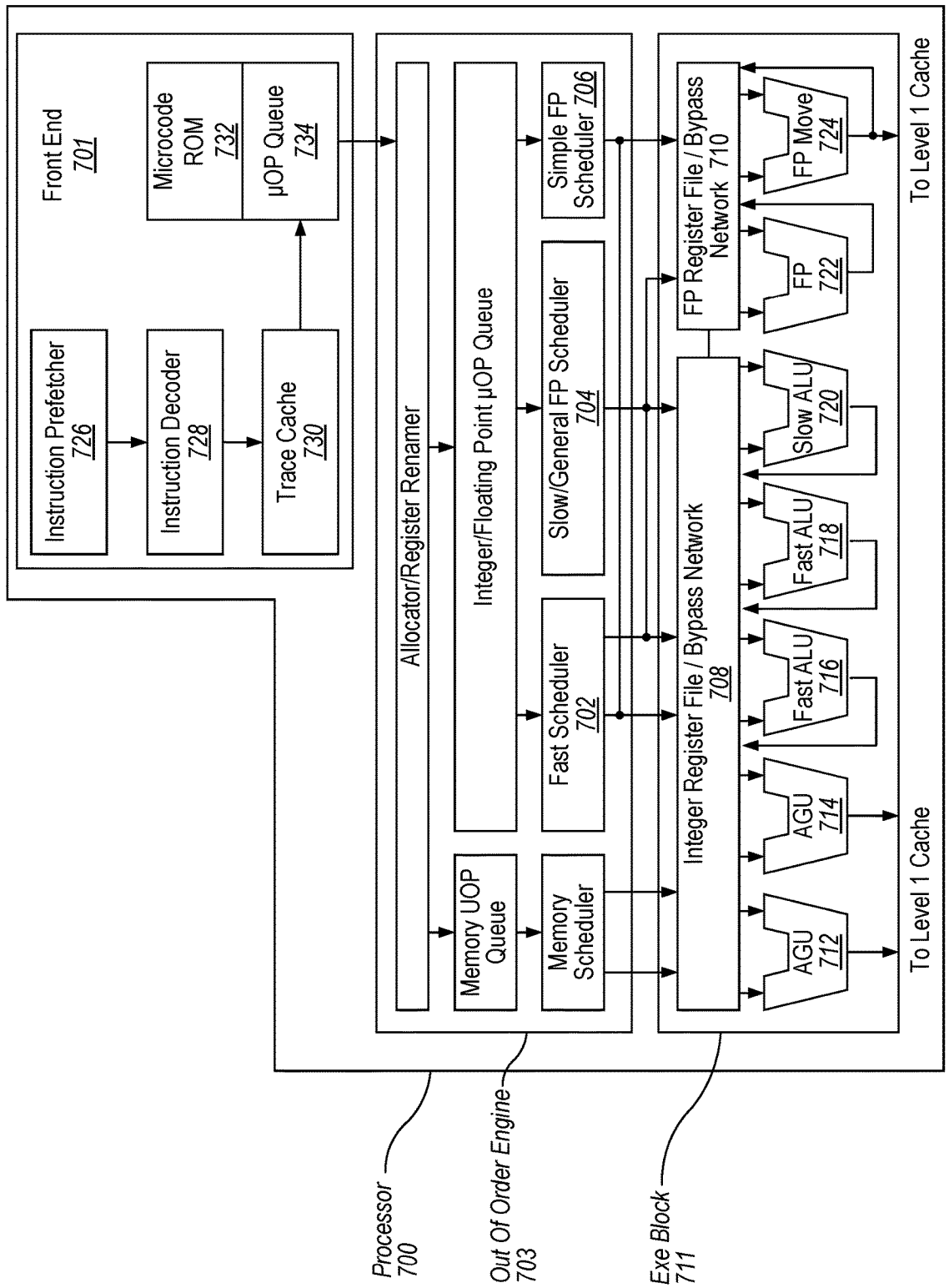
FIG. 7 illustrates a block diagram of the micro-architecture for a processor or an integrated circuit that implements hardware support for a multi-key cryptographic engine, according to an implementation of the disclosure.

FIG. 7 illustrates a block diagram of the micro-architecture for a processor 700 that includes logic circuits of a processor or an integrated circuit that implements hardware support for a multi-key cryptographic engine, according to an implementation of the disclosure. In some implementations, an instruction in accordance with one implementation can be implemented to operate on data elements having sizes of byte, word, doubleword, quadword, etc., as well as datatypes, such as single and double precision integer and floating point datatypes. In one implementation the in-order front end 701 is the part of the processor 700 that fetches instructions to be executed and prepares them to be used later in the processor pipeline. The implementations of the page additions and content copying can be implemented in processor 700.

The front end 701 may include several units. In one implementation, the instruction prefetcher 716 fetches instructions from memory and feeds them to an instruction decoder 718 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 730 takes decoded uops and assembles them into program ordered sequences or traces in the uop queue 734 for execution. When the trace cache 730 encounters a complex instruction, microcode ROM (or RAM) 732 provides the uops needed to complete the operation.

Some instructions are converted into a single micro-op, whereas others need several micro-ops to complete the full operation. In one implementation, if more than four micro-ops are needed to complete an instruction, the decoder 718 accesses the microcode ROM 732 to do the instruction. For one implementation, an instruction can be decoded into a small number of micro ops for processing at the instruction decoder 718. In another implementation, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one implementation from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one implementation can schedule on each half of the main clock cycle while the other schedulers can only schedule once per main processor clock cycle. The schedulers arbitrate for the dispatch ports to schedule uops for execution.

Register sets 708, 710, sit between the schedulers 702, 704, 706, and the execution units 712, 714, 716, 718, 720, 722, 724 in the execution block 711. There is a separate register set 708, 710, for integer and floating point operations, respectively. Each register set 708, 710, of one implementation also includes a bypass network that can bypass or forward just completed results that have not yet been written into the register set to new dependent uops. The integer register set 708 and the floating point register set 710 are also capable of communicating data with the other. For one implementation, the integer register set 708 is split into two separate register sets, one register set for the low order 32 bits of data and a second register set for the high order 32 bits of data. The floating point register set 710 of one implementation has 128 bit wide entries because floating point instructions typically have operands from 64 to 128 bits in width.

The execution block 711 contains the execution units 712, 714, 716, 718, 720, 722, 724, where the instructions are actually executed. This section includes the register sets 708, 710, that store the integer and floating point data operand values that the micro-instructions need to execute. The processor 700 of one implementation is comprised of a number of execution units: address generation unit (AGU) 712, AGU 714, fast ALU 716, fast ALU 718, slow ALU 720, floating point ALU 712, floating point move unit 714. For one implementation, the floating point execution blocks 712, 714, execute floating point, MMX, SIMD, and SSE, or other operations. The floating point ALU 712 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 716, 718. The fast ALUs 716, 718, of one implementation can execute fast operations with an effective latency of half a clock cycle. For one implementation, most complex integer operations go to the slow ALU 720 as the slow ALU 720 includes integer execution hardware for long latency type of operations, such as a multiplier, shifts, flag logic, and branch processing. Memory load/store operations are executed by the AGUs 722, 724. For one implementation, the integer ALUs 716, 718, 720, are described in the context of performing integer operations on 64 bit data operands. In alternative implementations, the ALUs 716, 718, 720, can be implemented to support a variety of data bits including 16, 32, 128, 256, etc. Similarly, the floating point units 722, 724, can be implemented to support a range of operands having bits of various widths. For one implementation, the floating point units 722, 724, can operate on 128 bits wide packed data operands in conjunction with SIMD and multimedia instructions.

In one implementation, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one implementation, integer registers store 32-bit integer data. A register set of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register set or different register sets. Furthermore, in one implementation, floating point and integer data may be stored in different registers or the same registers.

Figure 8:
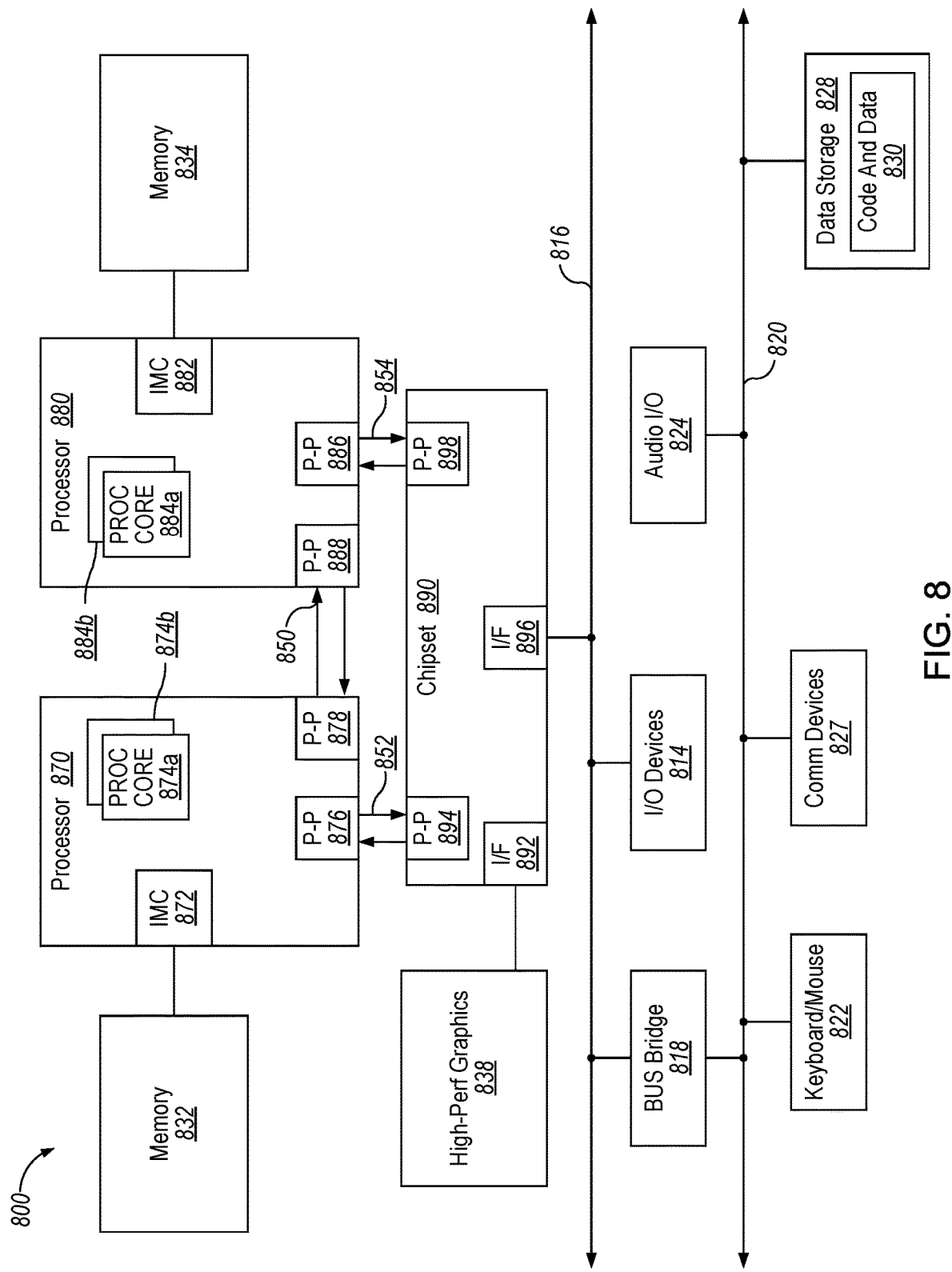
FIG. 8 is a block diagram of a computer system according to one implementation.

Implementations may be implemented in many different system types. Referring now to FIG. 8, shown is a block diagram of a multiprocessor system 800 that may implement hardware support for a multi-key cryptographic engine, in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. While shown with two processors 870, 880, it is to be understood that the scope of the disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 892.

Chipset 890 may be coupled to a first bus 816 via an interface 896. In one implementation, first bus 816 may be a Peripheral Component Interconnect (PCI) bus, or a bus such as a PCI Express bus or interconnect bus, although the scope of the disclosure is not so limited. Various I/O devices 814 may be coupled to first bus 816, along with a bus bridge 818 which couples first bus 816 to a second bus 820. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 820. Note that other architectures are possible. For example, instead of the point-to-point architecture of FIG. 8, a system may implement a multi-drop bus or other such architecture.

Figure 9:
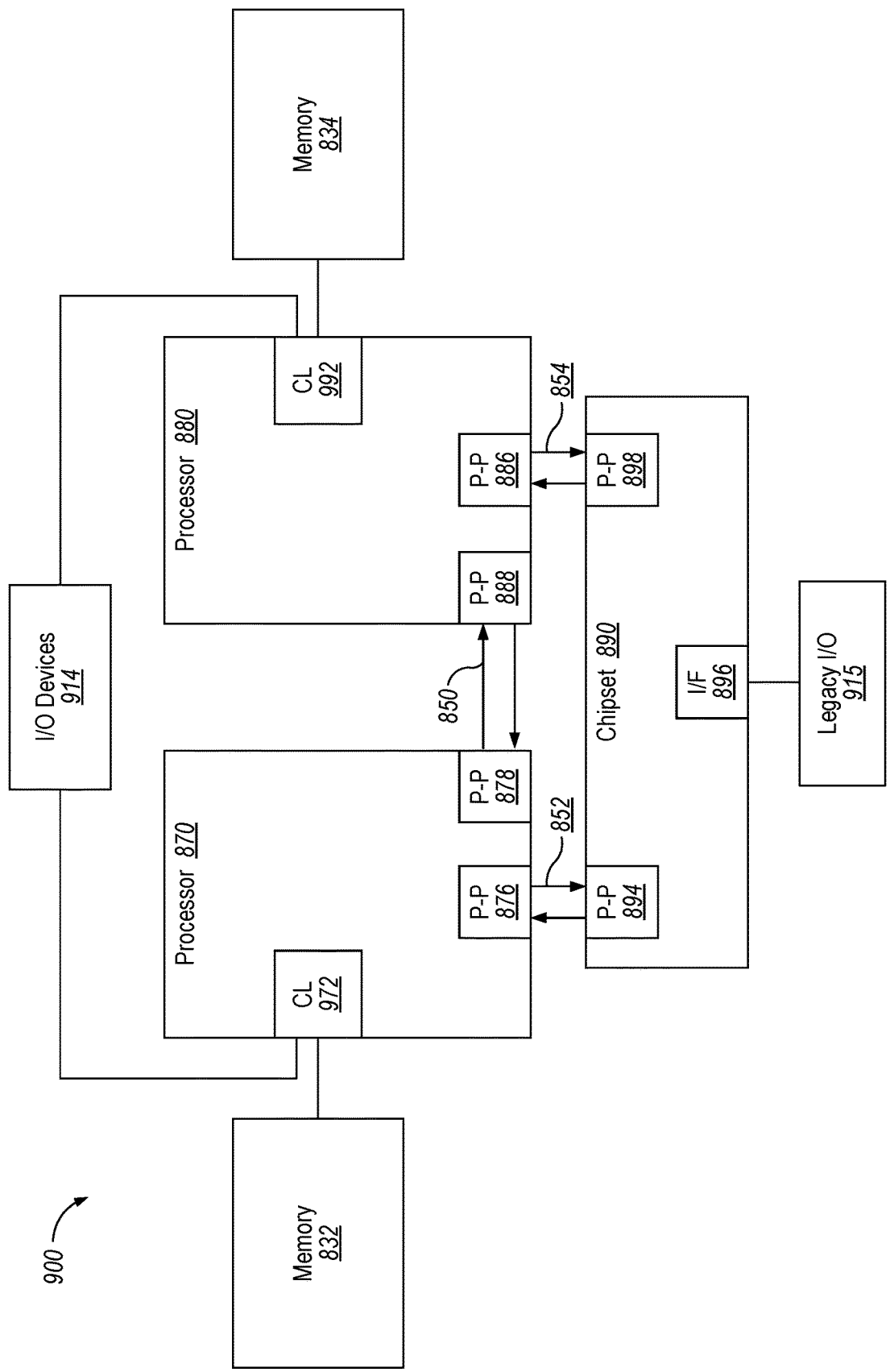
FIG. 9 is a block diagram of a computer system according to another implementation.

Referring now to FIG. 9, shown is a block diagram of a third system 900 that may implement hardware support for a multi-key cryptographic engine, in accordance with an implementation of the disclosure. Like elements in FIGS. 8 and 9 bear like reference numerals and certain aspects of FIG. 9 have been omitted from FIG. 8 in order to avoid obscuring other aspects of FIG. 9.

FIG. 9 illustrates that the processors 870, 880 may include integrated memory and I/O control logic ("CL") 972 and 992, respectively. For at least one implementation, the CL 972, 982 may include integrated memory controller units such as described herein. In addition. CL 972, 992 may also include I/O control logic. FIG. 9 illustrates that the memories 832, 834 are coupled to the CL 972, 992, and that I/O devices 914 are also coupled to the control logic 972, 992. Legacy I/O devices 915 are coupled to the chipset 890.

Figure 10:
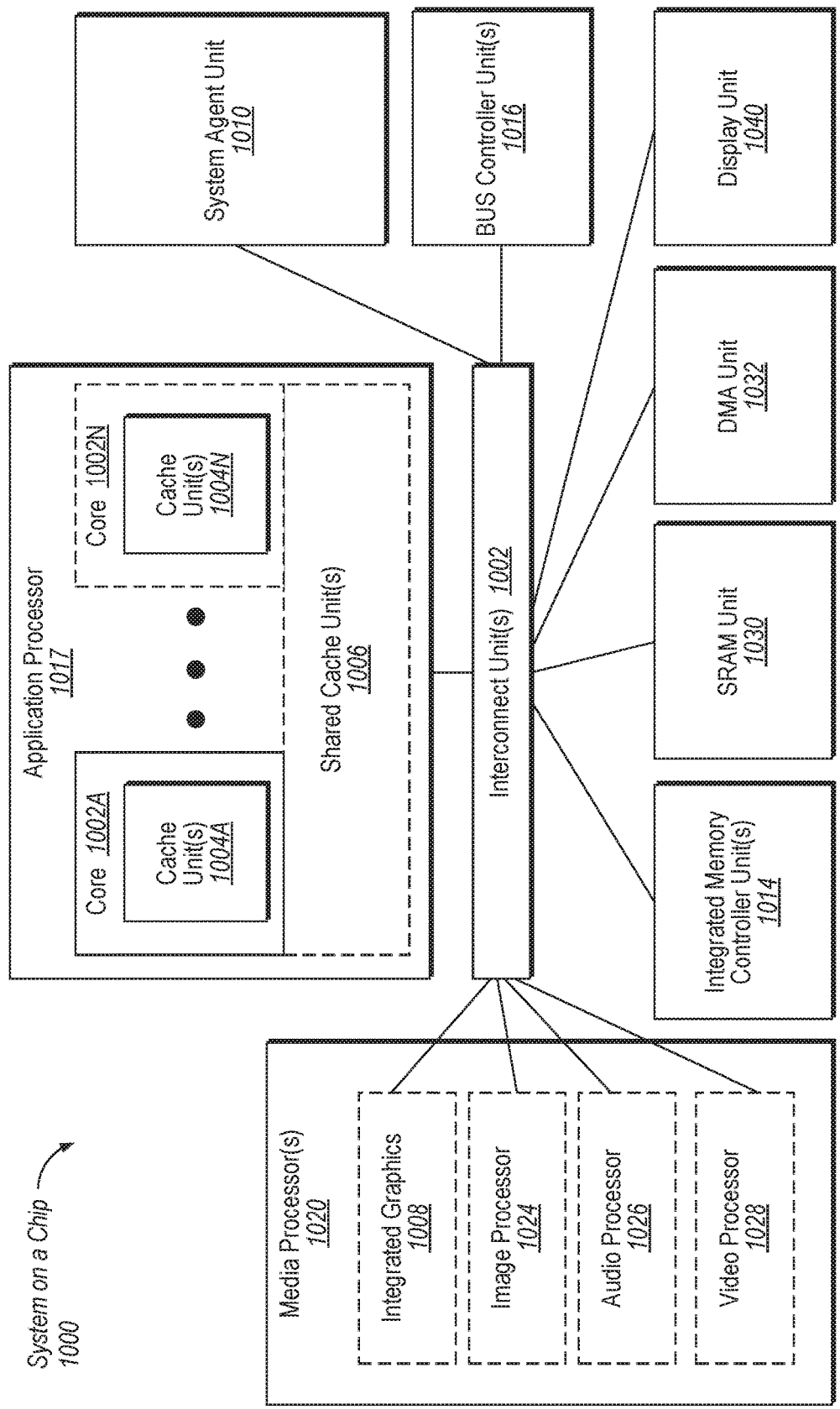
FIG. 10 is a block diagram of a system-on-a-chip according to one implementation.

FIG. 10 is an exemplary system on a chip (SoC) 1000 that may include one or more of the cores 1002A . . . 1002N that may implement hardware support for a multi-key cryptographic engine. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1000 of FIG. 10, dashed lined boxes are features on more advanced SoCs. An interconnect unit(s) 1002 may be coupled to: an application processor 1017 which includes a set of one or more cores 1002A-N, which include cache units 1004A-N, and shared cache unit(s) 1006; a system agent unit 1010; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
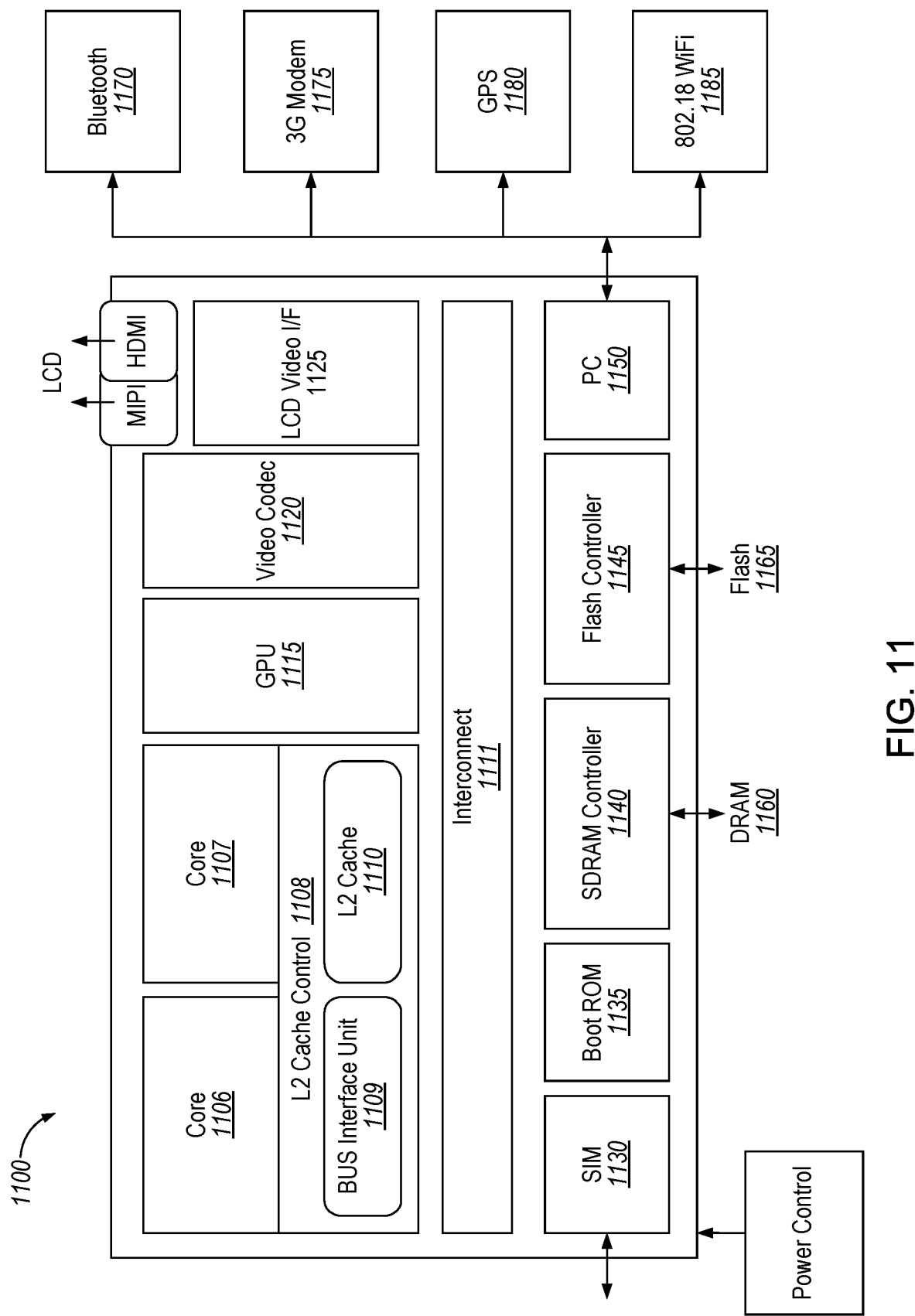
FIG. 11 illustrates another implementation of a block diagram for a computing system.

Turning next to FIG. 11, an implementation of a system on-chip (SoC) design that may implement hardware support for a multi-key cryptographic engine, in accordance with implementations of the disclosure is depicted. As an illustrative example, SoC 1100 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

In one implementation, SDRAM controller 1140 may connect to interconnect 1111 via cache 1110. Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the implementations described herein.

In addition, the system illustrates peripherals for communication, such as a Bluetooth® module 1170, 3G modem 1175, GPS 1180, and Wi-Fi® 1185. Note as stated above, a UE includes a radio for communication. As a result, these peripheral communication modules may not all be included. However, in a UE some form of a radio for external communication should be included.

Figure 12:
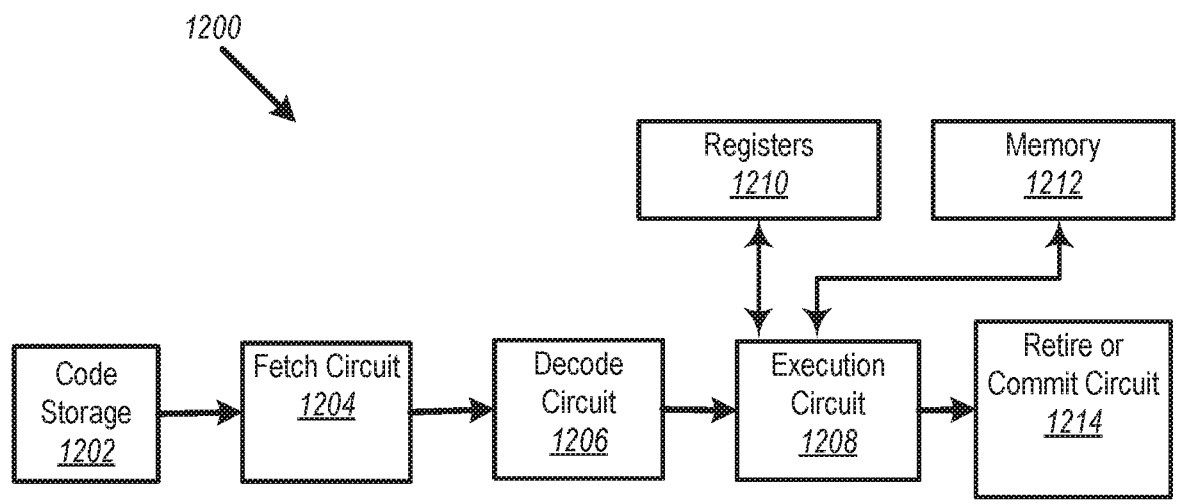
FIG. 12 is a block diagram of processing components for executing instructions that implements hardware support for a multi-key cryptographic engine, according one implementation.

FIG. 12 is a block diagram of processing components for executing instructions that implements hardware support for a multi-key cryptographic engine. As shown, computing system 1200 includes code storage 1202, fetch circuit 1204, decode circuit 1206, execution circuit 1208, registers 1210, memory 1212, and retire or commit circuit 1214. In operation, an instruction (e.g., BIND, UNWRAP) is to be fetched by fetch circuit 1204 from code storage 1202, which may comprise a cache memory, an on-chip memory, a memory on the same die as the processor, an instruction register, a general register, or system memory, without limitation. In one embodiment, the instruction may have a format similar to that of instruction 1400 in FIG. 14. After fetching the instruction from code storage 1202, decode circuit 1206 may decode the fetched instruction, including by parsing the various fields of the instruction. After decoding the fetched instruction, execution circuit 1208 is to execute the decoded instruction. In performing the step of executing the instruction, execution circuit 1208 may read data from and write data to registers 1210 and memory 1212. Registers 1210 may include a data register, an instruction register, a vector register, a mask register, a general register, an on-chip memory, a memory on the same die as the processor, or a memory in the same package as the processor, without limitation. Memory 1212 may include an on-chip memory, a memory on the same die as the processor, a memory in the same package as the processor, a cache memory, or system memory, without limitation. After the execution circuit executes the instruction, retire or commit circuit 1214 may retire the instruction, ensuring that execution results are written to or have been written to their destinations, and freeing up or releasing resources for later use.

Figure 13A:
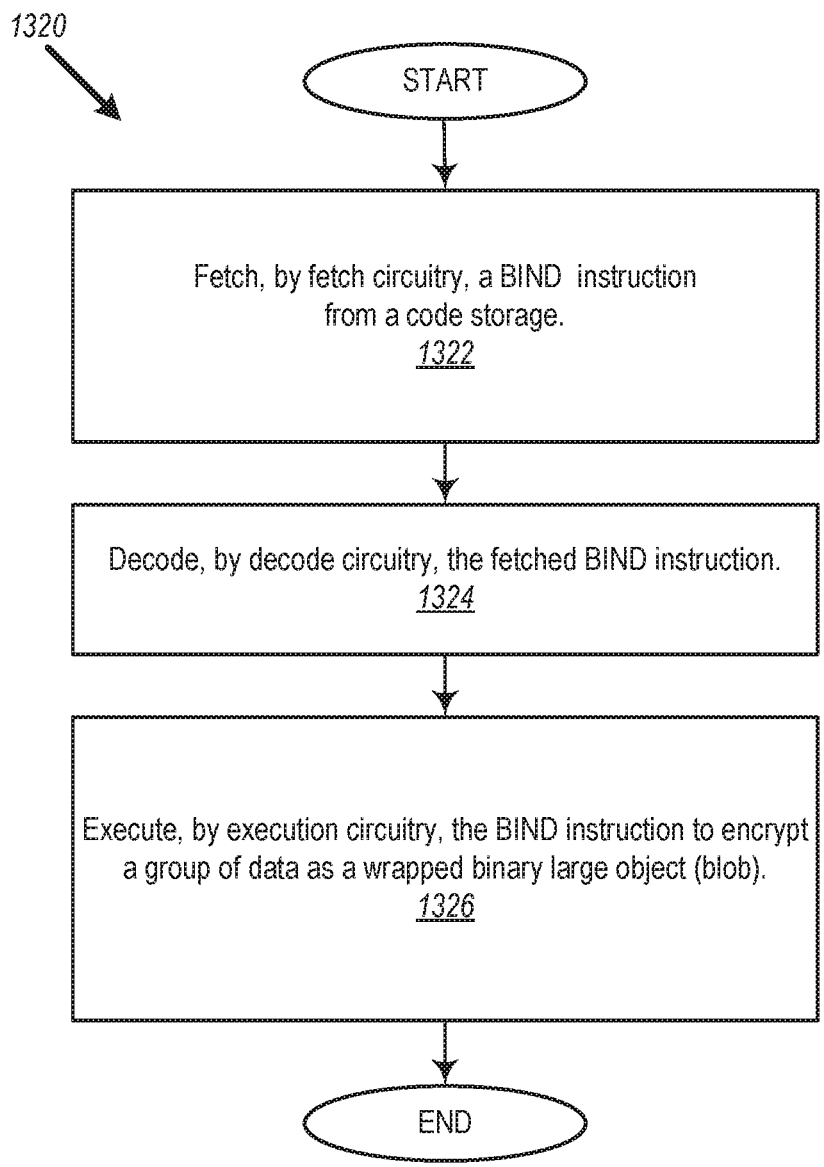
FIG. 13A is a flow diagram of an example method to be performed by a processor to execute an instruction to encrypt a group of data as a wrapped binary large object (blob).

FIG. 13A is a flow diagram of an example method 1320 to be performed by a processor to execute a BIND to encrypt a group of data as a wrapped binary large object (blob). After starting the process, a fetch circuit at block 1322 is to fetch the BIND instruction from a code storage. At optional block 1324, a decode circuit may decode the fetched BIND instruction. At block 1326, an execution circuit is to execute the BIND instruction to encrypt a group of data as a wrapped binary large object (blob), e.g., as explained with reference to block 310 in the method 300 of FIG. 3.

Figure 13B:
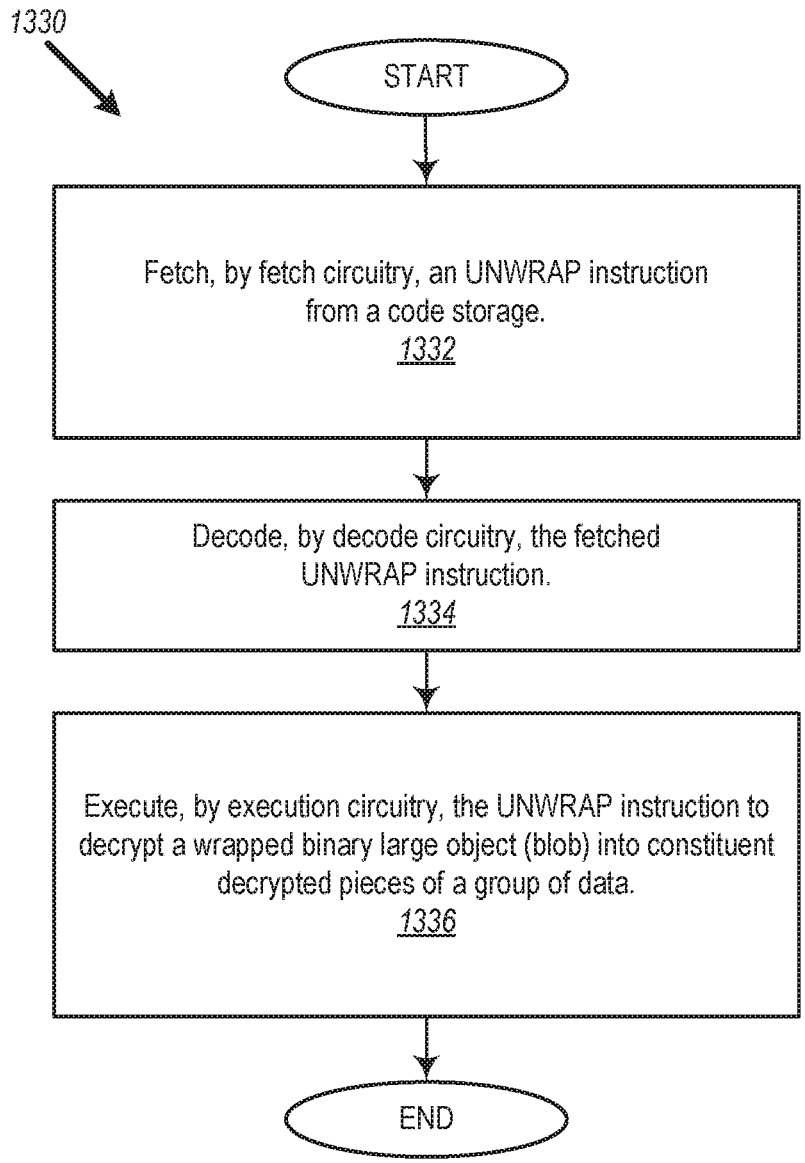
FIG. 13B is a flow diagram of an example method to be performed by a processor to execute an instruction to decrypt a wrapped blob into constituent pieces of a group of data.

FIG. 13B is a flow diagram of an example method 1330 to be performed by a processor to execute an UNWRAP instruction to decrypt a wrapped blob into constituent pieces of a group of data. After starting the process, a fetch circuit at block 1332 is to fetch the UNWRAP instruction from a code storage. At optional block 1334, a decode circuit may decode the fetched UNWRAP instruction. At block 1336, an execution circuit is to execute the UNWRAP instruction to decrypt a wrapped blob into constituent pieces of a group of data, e.g., as explained with reference to blocks 330-360 of the method 300 of FIG. 3.

Figure 14:
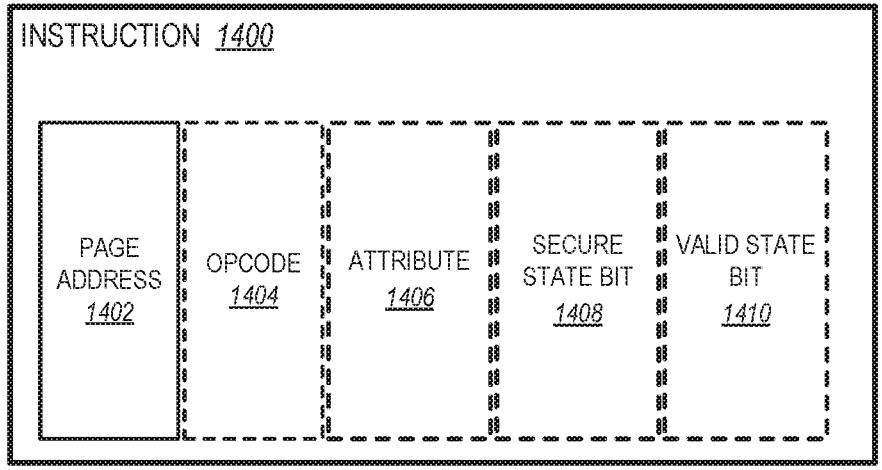
FIG. 14 is a block diagram illustrating an example format for instructions disclosed herein.

FIG. 14 is a block diagram illustrating an example format for instructions 1400 disclosed herein that implement hardware support for a multi-key cryptographic engine. The instruction 1400 may be BIND or UNWRAP. The parameters in the format of the instruction 1400 may be different for BIND, or UNWRAP. As such, some of the parameters are depicted as optional with dashed lines. As shown, instruction 1400 includes a page address 1402, optional opcode 1404, optional attribute 1406, optional secure state bit 1408, and optional valid state bit 1410.

Figure 15:
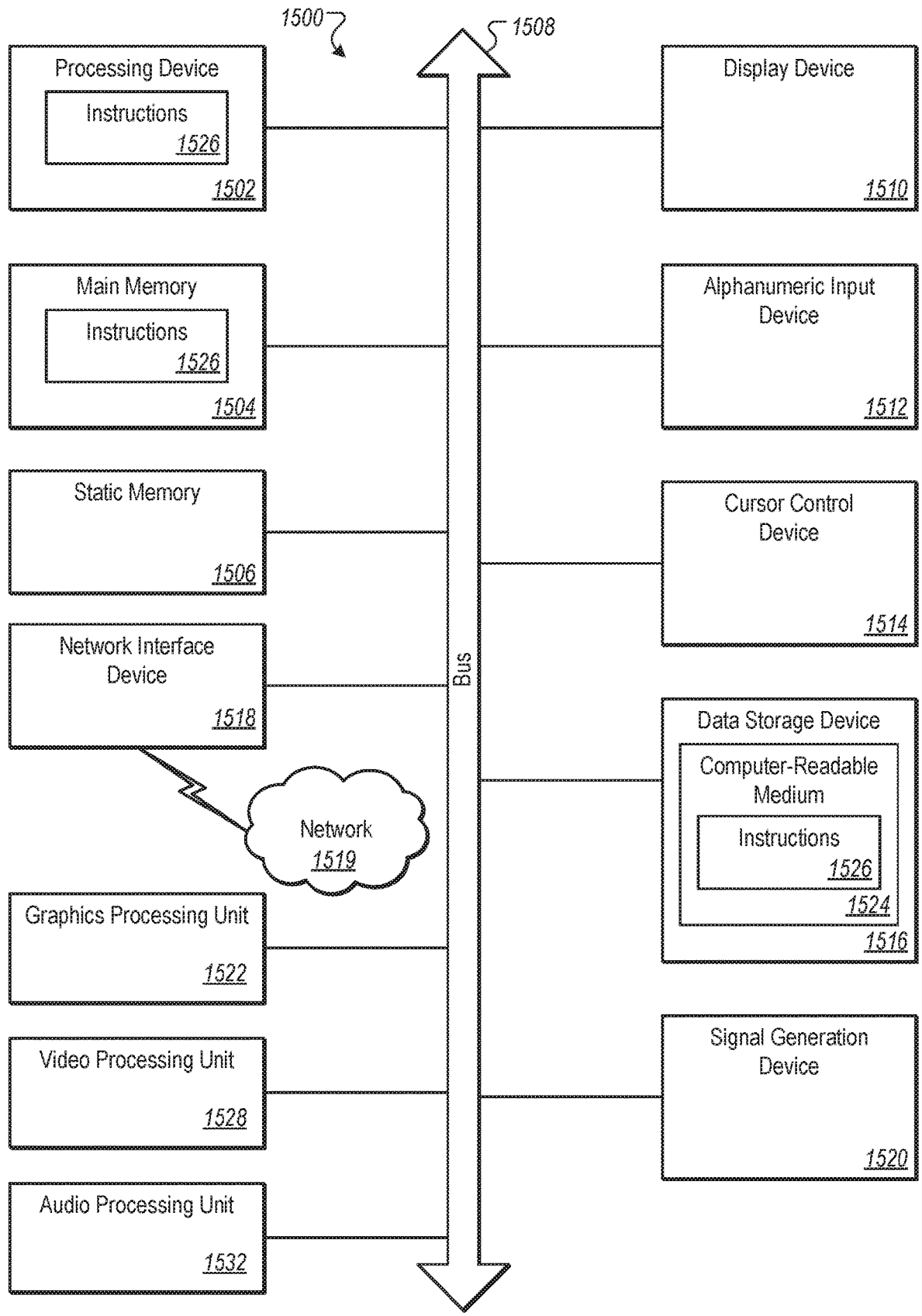
FIG. 15 illustrates another implementation of a block diagram for a computing system.

FIG. 15 illustrates a diagrammatic representation of a machine in the example form of a computing system 1500 within which a set of instructions, for causing the machine to implement hardware support for a multi-key cryptographic engine according any one or more of the methodologies discussed herein. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the page additions and content copying can be implemented in computing system 1500.

The computing system 1500 includes a processing device 1502, main memory 1504 (e.g., flash memory, dynamic random access memory (DRAM) (such as synchronous DRAM (SDRAM) or DRAM (RDRAM), etc.), a static memory 1506 (e.g., flash memory, static random access memory (SRAM), etc.), and a data storage device 1516, which communicate with each other via a bus 1508.

Processing device 1502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1502 may also be one or more special-purpose processing devices such as an application-specific integrated circuit (ASIC), a field programmable gate array (FPGA), a digital signal processor (DSP), network processor, or the like. In one implementation, processing device 1502 may include one or more processor cores. The processing device 1502 is configured to execute the processing logic 1526 for performing the operations discussed herein.

In one implementation, processing device 1502 can be part of a processor or an integrated circuit that includes the disclosed LLC caching architecture. Alternatively, the computing system 1500 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1500 may further include a network interface device 1518 communicably coupled to a network 1519. The computing system 1500 also may include a video display device 1510 (e.g., a liquid crystal display (LCD) or a cathode ray tube (CRT)), an alphanumeric input device 1512 (e.g., a keyboard), a cursor control device 1514 (e.g., a mouse), a signal generation device 1520 (e.g., a speaker), or other peripheral devices. Furthermore, computing system 1500 may include a graphics processing unit 1522, a video processing unit 1528 and an audio processing unit 1532. In another implementation, the computing system 1500 may include a chipset (not illustrated), which refers to a group of integrated circuits, or chips, that are designed to work with the processing device 1502 and controls communications between the processing device 1502 and external devices. For example, the chipset may be a set of chips on a motherboard that links the processing device 1502 to very high-speed devices, such as main memory 1504 and graphic controllers, as well as linking the processing device 1502 to lower-speed peripheral buses of peripherals, such as USB, PCI or ISA buses.

The data storage device 1516 may include a computer-readable storage medium 1524 on which is stored software 1526 embodying any one or more of the methodologies of functions described herein. The software 1526 may also reside, completely or at least partially, within the main memory 1504 as instructions 1526 and/or within the processing device 1502 as processing logic during execution thereof by the computing system 1500; the main memory 1504 and the processing device 1502 also constituting computer-readable storage media.

The computer-readable storage medium 1524 may also be used to store instructions 1526 utilizing the processing device 1502, and/or a software library containing methods that call the above applications. While the computer-readable storage medium 1524 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed implementations. The term "computer-readable storage medium" shall accordingly be taken to include, but not be limited to, solid-state memories, and optical and magnetic media.

The following examples pertain to further implementations.

Example 1 is processor comprising: 1) a memory controller of a server; and 2) a hardware cryptographic engine coupled to the memory controller, the hardware cryptographic engine comprising a key data structure to store multiple keys for corresponding multiple secure domains, each secure domain comprising a different workload to be serviced by the server, wherein the hardware cryptographic engine is to: a) receive a request to program a first secure domain into the hardware cryptographic engine, wherein the first secure domain comprises a new workload to be serviced by the server, and wherein the request comprises first domain information; b) determine whether there is an entry in the key data structure that is available; and c) in response to a determination that the entry is available, store the first domain information in the entry of the key data structure.

In Example 2, the processor of Example 1, wherein the first domain information comprises a first key and a first domain identifier for the first secure domain, and wherein the multiple keys provide cryptographic isolation between ones of the multiple secure domains.

In Example 3, the processor of Example 1, wherein the hardware cryptographic engine comprises a cache to store the key data structure, and wherein the key data structure is indexed according to cache lines of the cache, with a domain identifier of a secure domain corresponding to a number associated with the cache line.

In Example 4, the processor of Example 1, wherein in response to a determination that there is no entry available in the key data structure, the hardware cryptographic engine is further to: a) select a second secure domain to be de-scheduled, wherein the second secure domain is indexed within the key data structure at a second entry; b) encrypt, with use of a platform key, second domain information retrieved from the second entry for the second secure domain, to generate a wrapped binary large object (blob); and c) store the wrapped blob in a determined region of system memory that is indexed according to a domain identifier of the second secure domain.

In Example 5, the processor of Example 4, wherein the hardware cryptographic engine is further to store the first domain information in the second entry of the key data structure.

In Example 6, the processor of Example 4, wherein the hardware cryptographic engine is further to: a) detect a memory access request to the second secure domain; b) read the wrapped blob from the system memory; c) decrypt the wrapped blob, to generate the second domain information; and d) respond to the second domain information as a request to program the second secure domain into the hardware cryptographic engine.

In Example 7, the processor of Example 4, wherein upon boot of the server, a basic input/output system (BIOS) is to store, within a range register, reservation information to reserve the determined region of the system memory for hardware, and wherein the reservation information is utilized to program the hardware cryptographic engine.

Various implementations may have different combinations of the structural features described above. For instance, all optional features of the processors and methods described above may also be implemented with respect to a system described herein and specifics in the examples may be used anywhere in one or more implementations.

Example 8 is a server computing system comprising: 1) a processor core including a memory controller coupled to system memory; and 2) a hardware cryptographic engine coupled to the processor core and the memory controller, the hardware cryptographic engine comprising a key data structure to store multiple keys for corresponding multiple secure domains; wherein the processor core is to execute instructions to: a) receive a request to program a first secure domain into the hardware cryptographic engine, wherein the request comprises first domain information within a first wrapped binary large object (blob); and b) in response to the request and to a determination that there is no available entry in the key data structure: c) select a second secure domain to be de-scheduled, wherein the second secure domain is indexed within the key data structure at a target entry; d) issue a read key command to read second domain information from the target entry of the key data structure; e) encrypt, with use of a platform key, the second domain information retrieved from the target entry for the second secure domain, to generate a second wrapped blob; and f) store the second wrapped blob in a determined region of the system memory.

In Example 9, the server computing system of Example 8, wherein the first domain information comprises a first key and a first domain identifier for the first secure domain, and wherein the multiple keys provide cryptographic isolation between ones of the multiple secure domains.

In Example 10, the server computing system of Example 8, wherein in response to the request and to a first entry in the key data structure being available, the processor core is further to execute the instructions to: a) perform an unwrap operation to decrypt the first wrapped blob and generate the first domain information; b) program the first secure domain into the hardware cryptographic engine, wherein to program includes to store the first domain information in the first entry of the key data structure; and c) generate a cryptographic response indicative of a successful unwrap of the first wrapped blob.

In Example 11, the server computing system of Example 8, wherein the processor core is further to execute the instructions to: a) perform an unwrap operation to decrypt the first wrapped blob and generate the first domain information; and b) program the first secure domain into the hardware cryptographic engine, wherein to program includes to store the first domain information in the target entry of the key data structure.

In Example 12, the server computing system of Example 8, wherein the processor core is further to execute the instructions to: a) detect a memory access request to the second secure domain; b) read the second wrapped blob from the system memory at a location corresponding to a domain identifier of the second secure domain; and c) respond to the second wrapped blob as a request to program the second secure domain into the hardware cryptographic engine.

In Example 13, the server computing system of Example 8, wherein the determined region of the system memory is indexed according to domain identifiers of respective secure domains of the multiple secure domains.

In Example 14, the server computing system of Example 8, wherein upon boot of the server computing system, a basic input/output system (BIOS) is to store, within a range register, reservation information to reserve the determined region of the system memory for hardware that depends on a number of the multiple secure domains, and wherein the reservation information is utilized to program the hardware cryptographic engine.

Various implementations may have different combinations of the structural features described above. For instance, all optional features of the processors and methods described above may also be implemented with respect to a system described herein and specifics in the examples may be used anywhere in one or more implementations.

Example 15 is a non-transitory computer-readable medium storing instructions, which when executed by a processor having a core coupled to a system memory, cause the processor to execute a plurality of logic operations comprising: a) receiving a request to program a first secure domain into a hardware cryptographic engine of the processor, wherein the request includes first domain information within a first wrapped binary large object (blob); b) in response to the request and to a determination that there is no available entry in a key data structure stored within the hardware cryptographic engine: c) selecting a second secure domain to be de-scheduled, wherein the second secure domain is indexed within the key data structure at a target entry; d) issuing a read key command to read second domain information from the target entry of the key data structure; e) encrypting, using a platform key, the second domain information retrieved from the target entry for the second secure domain, to generate a second wrapped blob; and f) storing the second wrapped blob in a determined region of the system memory.

In Example 16, the non-transitory computer-readable medium of Example 15, wherein the first domain information comprises a first key and a first domain identifier for the first secure domain, wherein the key data structure is to store multiple keys for corresponding multiple secure domains, and wherein the multiple keys provide cryptographic isolation between ones of the multiple secure domains.

In Example 17, the non-transitory computer-readable medium of Example 15, wherein in response to the request and to a first entry in the key data structure being available, the plurality of logic operations further comprises: a) performing an unwrap operation to decrypt the first wrapped blob and generate the first domain information; b) programming the first secure domain into the hardware cryptographic engine, wherein programming includes storing the first domain information in the first entry of the key data structure; and c) generating a cryptographic response indicative of successful unwrapping of the first wrapped blob.

In Example 18, the non-transitory computer-readable medium of Example 15, wherein the plurality of logic operations further comprises: a) performing an unwrap operation to decrypt the first wrapped blob and generate the first domain information; and b) programming the first secure domain into the hardware cryptographic engine, wherein programming includes storing the first domain information in the target entry of the key data structure.

In Example 19, the non-transitory computer-readable medium of Example 15, wherein the plurality of logic operations further comprises: a) detecting a memory access request to the second secure domain; b) reading the second wrapped blob from the system memory at a location corresponding to a domain identifier of the second secure domain; and c) responding to the second wrapped blob as a request to program the second secure domain into the hardware cryptographic engine.

In Example 20, the non-transitory computer-readable medium of Example 15, wherein the key data structure is to store multiple keys for corresponding multiple secure domains, and wherein the determined region of the system memory is indexed according to domain identifiers of respective secure domains of the multiple secure domains.

Various implementations may have different combinations of the structural features described above. For instance, all optional features of the processors and methods described above may also be implemented with respect to a system described herein and specifics in the examples may be used anywhere in one or more implementations.

Example 21 is a processor comprising: 1) means for controller memory of a server; 2) means for storing multiple keys in a key data structure of a hardware cryptographic engine for corresponding multiple domains of the server, each secure domain comprising a different workload to be serviced by the server; 3) means for receiving a request to program a first secure domain into the hardware cryptographic engine, wherein the first secure domain comprises a new workload to be serviced by the server, and wherein the request comprises first domain information; 4) means for determining whether there is an entry in the key data structure that is available; and 5) in response to a determination that the entry is available, means for storing the first domain information in the entry of the key data structure.

In Example 22, the processor of Example 21, wherein the first domain information comprises a first key and a first domain identifier for the first secure domain, and wherein the multiple keys provide cryptographic isolation between ones of the multiple secure domains.

In Example 23, the processor of Example 21, wherein the means for storing comprises a cache to store the key data structure, and wherein the key data structure is indexed according to cache lines of the cache, with a domain identifier of a secure domain corresponding to a number associated with the cache line.

In Example 24, the processor of Example 21, wherein in response to a determination that there is no entry available in the key data structure, further comprising: 1) means for selecting a second secure domain to be de-scheduled, wherein the second secure domain is indexed within the key data structure at a second entry; 2) means for encrypting, with use of a platform key, second domain information retrieved from the second entry for the second secure domain, to generate a wrapped binary large object (blob); and 3) means for storing the wrapped blob in a determined region of system memory that is indexed according to a domain identifier of the second secure domain.

In Example 25, the processor of Example 24, further comprising means for storing the first domain information in the second entry of the key data structure.

In Example 26, the processor of Example 24, further comprising: 1) means for detecting a memory access request to the second secure domain; 2) means for reading the wrapped blob from the system memory; 3) means for decrypting the wrapped blob, to generate the second domain information; and 4) means for responding to the second domain information as a request to program the second secure domain into the hardware cryptographic engine.

In Example 27, the processor of Example 24, wherein upon boot of the server, means for storing, within a range register, reservation information to reserve the determined region of the system memory for hardware, and wherein the reservation information is utilized to program the hardware cryptographic engine.

Various implementations may have different combinations of the structural features described above. For instance, all optional features of the processors and methods described above may also be implemented with respect to a system described herein and specifics in the examples may be used anywhere in one or more implementations.

Example 28 is a method comprising: 1) storing, by a processing device of a server computing system, multiple keys in a key data structure of a hardware cryptographic engine, the multiple keys corresponding to multiple secure domains; 2) receiving, using the processing device, a request to program a first secure domain into the hardware cryptographic engine, wherein the request comprises first domain information within a first wrapped binary large object (blob); and 3) in response to receipt of the request and to a determination that there is no available entry in the key data structure, the processing device: a) selecting a second secure domain to be de-scheduled, wherein the second secure domain is indexed within the key data structure at a target entry; b) issuing a read key command to read second domain information from the target entry of the key data structure; c) encrypting, with use of a platform key, the second domain information retrieved from the target entry for the second secure domain, to generate a second wrapped blob; and d) storing the second wrapped blob in a determined region of system memory.

In Example 29, the method of Example 28, wherein the first domain information comprises a first key and a first domain identifier for the first secure domain, and wherein the multiple keys provide cryptographic isolation between ones of the multiple secure domains.

In Example 30, the method of Example 28, wherein in response to the request and to a first entry in the key data structure being available, the method further comprising: 1) performing an unwrap operation to decrypt the first wrapped blob and generate the first domain information; 2) programming the first secure domain into the hardware cryptographic engine, wherein to program includes to store the first domain information in the first entry of the key data structure; and 3) generating a cryptographic response indicative of a successful unwrap of the first wrapped blob.

In Example 31, the method of Example 28, further comprising: 1) performing an unwrap operation to decrypt the first wrapped blob and generate the first domain information; and 2) programming the first secure domain into the hardware cryptographic engine, wherein to program includes to store the first domain information in the target entry of the key data structure.

In Example 32, the method of Example 28, further comprising: 1) detecting a memory access request to the second secure domain; 2) reading the second wrapped blob from the system memory at a location corresponding to a domain identifier of the second secure domain; and 3) responding to the second wrapped blob as a request to program the second secure domain into the hardware cryptographic engine.

In Example 33, the method of Example 28, further comprising indexing the determined region of the system memory according to domain identifiers of respective secure domains of the multiple secure domains.

In Example 34, the method of Example 28, further comprising, upon boot of the server computing system, storing by a basic input/output system (BIOS), within a range register, reservation information to reserve the determined region of the system memory for hardware that depends on a number of the multiple secure domains, and wherein the reservation information is utilized to program the hardware cryptographic engine.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the disclosure.

The implementations are described with reference to determining validity of data in cache lines of a sector-based cache in specific integrated circuits, such as in computing platforms or microprocessors. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processor, other implementations are applicable to other types of integrated circuits and logic devices. Similar techniques and teachings of implementations of the disclosure can be applied to other types of circuits or semiconductor devices that can benefit from higher pipeline throughput and improved performance. The teachings of implementations of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the above examples describe instruction handling and distribution in the context of execution units and logic circuits, other implementations of the disclosure can be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as can be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one implementation, refers to some apparatus, logic, hardware, and/or element designed in such a way to enable use of the apparatus, logic, hardware, and/or element in a specified manner. Note as above that use of 'to,' 'capable to,' or 'operable to,' in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform implementations of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a memory controller of a server; and
    a hardware cryptographic engine coupled to the memory controller, the hardware cryptographic engine comprising a cache to store a key data structure, wherein the key data structure is to store multiple keys for corresponding multiple secure domains, each secure domain comprising a different workload to be serviced by the server, wherein the hardware cryptographic engine is to:
        receive a request to program a first secure domain into the hardware cryptographic engine, wherein the first secure domain comprises a new workload to be serviced by the server, and wherein the request comprises first domain information;
        determine whether there is an entry at a cache line of the key data structure that is available to be written; and in response to a determination that the entry is available, store the first domain information in the entry of the key data structure.

2. The processor of claim 1, wherein the first domain information comprises a first key and a first domain identifier for the first secure domain, and wherein the multiple keys provide cryptographic isolation between ones of the multiple secure domains.

3. The processor of claim 1, wherein the key data structure is indexed according to cache lines of the cache, with a domain identifier of a secure domain corresponding to a number associated with the cache line.

4. The processor of claim 1, wherein in response to a determination that there is no entry available in the key data structure, the hardware cryptographic engine is further to:
    select a second secure domain to be de-scheduled, wherein the second secure domain is indexed within the key data structure at a second entry;
    encrypt, with use of a platform key, second domain information retrieved from the second entry for the second secure domain, to generate a wrapped binary large object (blob); and
    store the wrapped blob in a determined region of system memory that is indexed according to a domain identifier of the second secure domain.

5. The processor of claim 4, wherein the hardware cryptographic engine is further to store the first domain information in the second entry of the key data structure.

6. The processor of claim 4, wherein the hardware cryptographic engine is further to:
    detect a memory access request to the second secure domain;
    read the wrapped blob from the system memory;
    decrypt the wrapped blob, to generate the second domain information; and
    respond to the second domain information as a request to program the second secure domain into the hardware cryptographic engine.

7. The processor of claim 4, wherein upon boot of the server, a basic input/output system (BIOS) is to store, within a range register, reservation information to reserve the determined region of the system memory for hardware, and wherein the reservation information is utilized to program the hardware cryptographic engine.

8. A server computing system comprising:
    a processor core including a memory controller coupled to system memory; and
    a hardware cryptographic engine coupled to the processor core and the memory controller, the hardware cryptographic engine comprising a key data structure to store multiple keys for corresponding multiple secure domains;
    wherein the processor core is to execute instructions to:
        receive a request to program a first secure domain into the hardware cryptographic engine, wherein the request comprises first domain information within a first wrapped binary large object (blob); and
        in response to the request and to a determination that there is no available entry in the key data structure:
            select a second secure domain to be de-scheduled, wherein the second secure domain is indexed within the key data structure at a target entry;
            issue a read key command to read second domain information from the target entry of the key data structure;
            encrypt, with use of a platform key, the second domain information retrieved from the target entry for the second secure domain, to generate a second wrapped blob; and
            store the second wrapped blob in a determined region of the system memory.

9. The server computing system of claim 8, wherein the first domain information comprises a first key and a first domain identifier for the first secure domain, and wherein the multiple keys provide cryptographic isolation between ones of the multiple secure domains.

10. The server computing system of claim 8, wherein in response to the request and to a first entry in the key data structure being available, the processor core is further to execute the instructions to:
    perform an unwrap operation to decrypt the first wrapped blob and generate the first domain information;
    program the first secure domain into the hardware cryptographic engine, wherein to program includes to store the first domain information in the first entry of the key data structure; and
    generate a cryptographic response indicative of a successful unwrap of the first wrapped blob.

11. The server computing system of claim 8, wherein the processor core is further to execute the instructions to:
    perform an unwrap operation to decrypt the first wrapped blob and generate the first domain information; and
    program the first secure domain into the hardware cryptographic engine, wherein to program includes to store the first domain information in the target entry of the key data structure.

12. The server computing system of claim 8, wherein the processor core is further to execute the instructions to:
    detect a memory access request to the second secure domain;
    read the second wrapped blob from the system memory at a location corresponding to a domain identifier of the second secure domain; and
    respond to the second wrapped blob as a request to program the second secure domain into the hardware cryptographic engine.

13. The server computing system of claim 8, wherein the determined region of the system memory is indexed according to domain identifiers of respective secure domains of the multiple secure domains.

14. The server computing system of claim 8, wherein upon boot of the server computing system, a basic input/output system (BIOS) is to store, within a range register, reservation information to reserve the determined region of the system memory for hardware that depends on a number of the multiple secure domains, and wherein the reservation information is utilized to program the hardware cryptographic engine.

15. A non-transitory computer-readable medium storing instructions, which when executed by a processor having a core coupled to a system memory, cause the processor to execute a plurality of logic operations comprising:
    receiving a request to program a first secure domain into a hardware cryptographic engine of the processor, wherein the request includes first domain information within a first wrapped binary large object (blob);
    in response to the request and to a determination that there is no available entry in a key data structure stored within the hardware cryptographic engine:
        selecting a second secure domain to be de-scheduled, wherein the second secure domain is indexed within the key data structure at a target entry;

issuing a read key command to read second domain information from the target entry of the key data structure;

encrypting, using a platform key, the second domain information retrieved from the target entry for the second secure domain, to generate a second wrapped blob; and storing the second wrapped blob in a determined region of the system memory.

16. The non-transitory computer-readable medium of claim 15, wherein the first domain information comprises a first key and a first domain identifier for the first secure domain, wherein the key data structure is to store multiple keys for corresponding multiple secure domains, and wherein the multiple keys provide cryptographic isolation between ones of the multiple secure domains.

17. The non-transitory computer-readable medium of claim 15, wherein in response to the request and to a first entry in the key data structure being available, the plurality of logic operations further comprises:

performing an unwrap operation to decrypt the first wrapped blob and generate the first domain information;

programming the first secure domain into the hardware cryptographic engine, wherein programming includes storing the first domain information in the first entry of the key data structure; and generating a cryptographic response indicative of successful unwrapping of the first wrapped blob.

18. The non-transitory computer-readable medium of claim 15, wherein the plurality of logic operations further comprises:

performing an unwrap operation to decrypt the first wrapped blob and generate the first domain information; and programming the first secure domain into the hardware cryptographic engine, wherein programming includes storing the first domain information in the target entry of the key data structure.

19. The non-transitory computer-readable medium of claim 15, wherein the plurality of logic operations further comprises:

detecting a memory access request to the second secure domain;

reading the second wrapped blob from the system memory at a location corresponding to a domain identifier of the second secure domain; and responding to the second wrapped blob as a request to program the second secure domain into the hardware cryptographic engine.

20. The non-transitory computer-readable medium of claim 15, wherein the key data structure is to store multiple keys for corresponding multiple secure domains, and wherein the determined region of the system memory is indexed according to domain identifiers of respective secure domains of the multiple secure domains.

* * * * *